US006859783B2

(12) United States Patent
Cogger et al.

(10) Patent No.: US 6,859,783 B2
(45) Date of Patent: *Feb. 22, 2005

(54) INTEGRATED INTERFACE FOR WEB BASED CUSTOMER CARE AND TROUBLE MANAGEMENT

(75) Inventors: Timothy John Cogger, Chapel Hill, NC (US); Isaac A. Kunkel, III, Apex, NC (US); David Todd Miller, Fuquay-Varina, NC (US); Suma P. Patil, Apex, NC (US)

(73) Assignee: WorldCom, Inc., Clinton, MS (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 612 days.

(21) Appl. No.: 09/159,403

(22) Filed: Sep. 24, 1998

(65) Prior Publication Data

US 2002/0087383 A1 Jul. 4, 2002

Related U.S. Application Data

(63) Continuation-in-part of application No. 08/581,728, filed on Dec. 29, 1995.
(60) Provisional application No. 60/060,655, filed on Sep. 26, 1997.

(51) Int. Cl.[7] .............................................. G06F 17/60
(52) U.S. Cl. ......................................... 705/10; 235/381
(58) Field of Search ............................ 705/10; 235/381

(56) References Cited

U.S. PATENT DOCUMENTS

| 4,345,315 A | * | 8/1982 | Cadotte et al. ................ 705/10 |
| 4,893,248 A | | 1/1990 | Pitts et al. |
| 4,972,504 A | * | 11/1990 | Daniel, Jr. et al. ............. 705/10 |
| 5,041,972 A | * | 8/1991 | Frost ............................ 705/10 |

(List continued on next page.)

FOREIGN PATENT DOCUMENTS

| EP | 0 747 841 | | 12/1996 | | |
| JP | 09064870 A | | 3/1997 | | |
| WO | WO97/11443 | | 3/1997 | | |
| WO | WO 97/16911 | | 5/1997 | | |
| WO | 97/18515 | | 5/1997 | | |
| WO | WO 99/01876 | * | 1/1999 | ........... | G06F/17/00 |
| WO | WO 0013375 | * | 3/2000 | ........... | H04L/12/28 |

OTHER PUBLICATIONS

*Computer Networks*, Andrew S. Tanenbaum, pp. 410–412.
"XIIR6.3 (Broadway) Overview", http://www.x.org/broadway.htm.
"Stac Unveils Windows NT 4.0 and Web Browser Support in New ReachOut 7" http://www.stac.com/news/pressrel/prro7unveil.html.
"Mixed Messages"—UNIX Review—Feb. 1998—Yager T.*

(List continued on next page.)

*Primary Examiner*—Vincent Millin
*Assistant Examiner*—Geoffrey Akers

(57) ABSTRACT

A system and method for opening and tracking trouble tickets over the public Internet. A customer service management system provides information included within a customer profile record to a Web enabled infrastructure which is accessible by a remote customer workstation having a web browser and Internet access. The customer profile information is used to prepopulate data fields in dialogs used to open a trouble ticket. Once a trouble ticket is opened, the customer workstation tracks the existing trouble tickets through a browser based graphical user interface. The graphical user interface provides current and historical status reports of the actions taken to resolve a network event and the service organizations responsible for resolving the network event.

19 Claims, 25 Drawing Sheets

U.S. PATENT DOCUMENTS

| | | | |
|---|---|---|---|
| 5,075,771 A | * 12/1991 | Hashimoto | 348/13 |
| 5,088,052 A | 2/1992 | Spielman et al. | |
| 5,131,020 A | 7/1992 | Liebesny et al. | |
| 5,136,707 A | 8/1992 | Block et al. | |
| 5,208,908 A | 5/1993 | Harrison et al. | |
| 5,223,699 A | 6/1993 | Flynn et al. | |
| 5,245,533 A | * 9/1993 | Marshall | 705/10 |
| 5,262,760 A | 11/1993 | Iwamura et al. | |
| 5,287,270 A | 2/1994 | Hardy et al. | |
| 5,313,598 A | 5/1994 | Yamakawa | |
| 5,315,093 A | * 5/1994 | Stewart | 235/381 |
| 5,325,290 A | 6/1994 | Cauffman et al. | |
| 5,327,486 A | 7/1994 | Wolff et al. | |
| 5,361,259 A | 11/1994 | Hunt et al. | |
| 5,369,571 A | * 11/1994 | Metts | 705/10 |
| 5,452,446 A | 9/1995 | Johnson | |
| 5,475,836 A | 12/1995 | Harris et al. | |
| 5,483,596 A | 1/1996 | Rosenow et al. | |
| 5,490,060 A | * 2/1996 | Malec et al. | 705/10 |
| 5,491,779 A | 2/1996 | Bezjian | |
| 5,491,796 A | 2/1996 | Michele et al. | |
| 5,506,893 A | 4/1996 | Buscher et al. | |
| 5,526,257 A | * 6/1996 | Lerner | 705/10 |
| 5,530,744 A | 6/1996 | Charalambous et al. | |
| 5,533,108 A | 7/1996 | Harris et al. | |
| 5,539,734 A | 7/1996 | Burwell et al. | |
| 5,548,726 A | 8/1996 | Pettus | |
| 5,555,290 A | 9/1996 | McLeod et al. | |
| 5,557,668 A | 9/1996 | Brady | |
| 5,586,260 A | 12/1996 | Hu | |
| 5,602,918 A | 2/1997 | Chen et al. | |
| 5,621,727 A | 4/1997 | Vaudreuil | |
| 5,623,601 A | 4/1997 | Vu | |
| 5,649,182 A | 7/1997 | Reitz | |
| 5,650,994 A | 7/1997 | Daley | |
| 5,659,601 A | 8/1997 | Cheslog | |
| 5,666,481 A | 9/1997 | Lewis | |
| 5,671,354 A | 9/1997 | Ito et al. | |
| 5,689,645 A | 11/1997 | Schettler et al. | |
| 5,692,030 A | 11/1997 | Teglovic et al. | |
| 5,694,546 A | 12/1997 | Reisman | |
| 5,696,906 A | 12/1997 | Peters et al. | |
| 5,699,403 A | 12/1997 | Ronnen | |
| 5,706,502 A | 1/1998 | Foley et al. | |
| 5,708,780 A | 1/1998 | Levergood et al. | |
| 5,710,882 A | 1/1998 | Svennevik et al. | |
| 5,721,908 A | 2/1998 | Lagarde et al. | |
| 5,721,913 A | 2/1998 | Ackroff et al. | |
| 5,727,129 A | 3/1998 | Barrett et al. | |
| 5,734,709 A | 3/1998 | DeWitt et al. | |
| 5,734,831 A | 3/1998 | Sanders | |
| 5,742,762 A | 4/1998 | Scholl et al. | |
| 5,742,768 A | 4/1998 | Gennaro et al. | |
| 5,742,905 A | 4/1998 | Pepe et al. | |
| 5,745,754 A | 4/1998 | Lagarde et al. | |
| 5,754,830 A | 5/1998 | Butts et al. | |
| 5,757,900 A | 5/1998 | Nagel et al. | |
| 5,764,756 A | 6/1998 | Onweller | |
| 5,768,501 A | 6/1998 | Lewis | |
| 5,774,660 A | 6/1998 | Brendel et al. | |
| 5,774,670 A | 6/1998 | Montulli | |
| 5,778,178 A | 7/1998 | Arunachalam | |
| 5,781,550 A | 7/1998 | Templin et al. | |
| 5,781,632 A | 7/1998 | Odom | |
| 5,787,160 A | 7/1998 | Chaney et al. | |
| 5,790,780 A | 8/1998 | Brichta et al. | |
| 5,790,789 A | 8/1998 | Suarez | |
| 5,790,797 A | 8/1998 | Shimada et al. | |
| 5,793,694 A | 8/1998 | Rogers et al. | |
| 5,793,762 A | 8/1998 | Penners et al. | |
| 5,793,964 A | 8/1998 | Rogers et al. | |
| 5,796,393 A | 8/1998 | MacNaughton et al. | |
| 5,799,154 A | 8/1998 | Kuriyan | |
| 5,802,320 A | 9/1998 | Baehr et al. | |
| 5,805,803 A | 9/1998 | Birrell et al. | |
| 5,812,654 A | 9/1998 | Anderson et al. | |
| 5,815,080 A | 9/1998 | Taguchi | |
| 5,815,665 A | 9/1998 | Teper et al. | |
| 5,819,225 A | 10/1998 | Eastwood et al. | |
| 5,819,271 A | 10/1998 | Mahoney et al. | |
| 5,825,890 A | 10/1998 | Elgamal et al. | |
| 5,826,029 A | 10/1998 | Gore, Jr. et al. | |
| 5,826,269 A | 10/1998 | Hussey | |
| 5,832,519 A | 11/1998 | Bowen et al. | |
| 5,835,084 A | 11/1998 | Bailey et al. | |
| 5,844,896 A | 12/1998 | Marks et al. | |
| 5,845,067 A | 12/1998 | Porter et al. | |
| 5,845,267 A | 12/1998 | Ronen | |
| 5,848,233 A | 12/1998 | Radia et al. | |
| 5,848,396 A | * 12/1998 | Gerace | 705/10 |
| 5,848,399 A | 12/1998 | Burke | |
| 5,850,517 A | 12/1998 | Verkler et al. | |
| 5,852,810 A | 12/1998 | Sotiroff et al. | |
| 5,852,812 A | 12/1998 | Reeder | |
| 5,867,495 A | 2/1999 | Elliott et al. | |
| 5,875,236 A | 2/1999 | Jankowitz et al. | |
| 5,881,237 A | 3/1999 | Schwaller et al. | |
| 5,883,948 A | 3/1999 | Dunn | |
| 5,884,312 A | 3/1999 | Dustan et al. | |
| 5,930,764 A | * 7/1999 | Melchione et al. | 705/10 |
| 5,933,142 A | 8/1999 | LaStrange et al. | |
| 5,937,165 A | 8/1999 | Schwaller et al. | |
| 5,938,729 A | 8/1999 | Cote et al. | |
| 5,949,976 A | 9/1999 | Chappelle | |
| 5,953,389 A | 9/1999 | Pruett et al. | |
| 5,956,714 A | 9/1999 | Condon | |
| 5,960,411 A | 9/1999 | Hartman et al. | |
| 5,970,467 A | * 10/1999 | Alavi | 705/10 |
| 5,974,396 A | * 10/1999 | Anderson et al. | 705/10 |
| 5,982,864 A | 11/1999 | Jagadish et al. | |
| 5,983,350 A | 11/1999 | Minear et al. | |
| 5,987,523 A | 11/1999 | Hind et al. | |
| 5,991,746 A | 11/1999 | Wang | |
| 5,999,525 A | 12/1999 | Krishnaswamy et al. | |
| 5,999,965 A | 12/1999 | Kelly | |
| 6,003,079 A | 12/1999 | Friedrich et al. | |
| 6,006,265 A | 12/1999 | Rangan et al. | |
| 6,012,090 A | 1/2000 | Chung et al. | |
| 6,018,768 A | 1/2000 | Ullman et al. | |
| 6,021,409 A | 2/2000 | Burrows | |
| 6,029,182 A | 2/2000 | Nehab et al. | |
| 6,041,357 A | 3/2000 | Kunzelman et al. | |
| 6,044,362 A | 3/2000 | Neely | |
| 6,049,789 A | 4/2000 | Smorodinsky | |
| 6,052,450 A | 4/2000 | Allison et al. | |
| 6,058,170 A | 5/2000 | Jagadish et al. | |
| 6,072,493 A | 6/2000 | Driskell et al. | |
| 6,073,122 A | 6/2000 | Wool | |
| 6,078,891 A | * 6/2000 | Riordan et al. | 705/10 |
| 6,084,953 A | 7/2000 | Bardenheuer et al. | |
| 6,088,451 A | 7/2000 | He et al. | |
| 6,088,796 A | 7/2000 | Cianfrocca et al. | |
| 6,104,704 A | 8/2000 | Buhler et al. | |
| 6,105,131 A | 8/2000 | Carroll | |
| 6,108,700 A | 8/2000 | Maccobee et al. | |
| 6,108,782 A | 8/2000 | Fletcher et al. | |
| 6,112,238 A | 8/2000 | Boyd et al. | |
| 6,112,242 A | 8/2000 | Jois et al. | |
| 6,115,458 A | 9/2000 | Taskett | |
| 6,119,109 A | 9/2000 | Muratani et al. | |
| 6,122,258 A | 9/2000 | Brown | |

| | | |
|---|---|---|
| 6,130,933 A | 10/2000 | Miloslavsky |
| 6,131,116 A | 10/2000 | Riggins et al. |
| 6,154,744 A | 11/2000 | Kenner et al. |
| 6,161,102 A | 12/2000 | Yanagihara et al. |
| 6,161,126 A | 12/2000 | Wies et al. |
| 6,163,597 A | 12/2000 | Voit |
| 6,173,311 B1 | 1/2001 | Hassett et al. |
| 6,182,113 B1 | 1/2001 | Peterson et al. |
| 6,205,456 B1 | 3/2001 | Nakao |
| 6,212,506 B1 | 4/2001 | Shah et al. |
| 6,240,450 B1 | 5/2001 | Sharples et al. |
| 6,275,490 B1 | 8/2001 | Mattaway et al. |
| 6,286,050 B1 | 9/2001 | Pullen et al. |
| 6,292,481 B1 | 9/2001 | Voit et al. |
| 6,295,551 B1 | 9/2001 | Roberts et al. |
| 6,377,993 B1 | 4/2002 | Brandt et al. |
| 2001/0001014 A1 | 5/2001 | Akins, III et al. |
| 2001/0003828 A1 | 6/2001 | Narayanaswami |

OTHER PUBLICATIONS

"Help for Web Enhanced Customer Support"—Infoworld Jun. 1997 Biggs M.*

Yager T. UNIX Review v16 n2 p29 Feb. 1998 "Mixed Messages".*

Maggie Biggs Infoworld Jun. 16, 1997 v19 N24 p82+.*

Newswire Association Oct. 13, 1997 McAfees Self Service HelpDesk Web Site.*

Business Evolution Inc(Kannan P et al) WO 9901826 .*

"Cryptography and the Internet". www.echonyc.com~vsuecrypt.html. 1995.

Lee et al., "Supporting Multi–User, Multi–Applet Workspaces in CBE", Computer Supported Cooperative Work 1996. Cambridge, MA.

"Netscape 2.0 Beta Hip or Hype?". www.plant.net.auinnovations20beta.html. Planet Internet. 1995.

Kenney, Kathleen, "American Management Systems Launces Internet–Based Customer Care and Billing Tool for Telecom Firms", PR Newswire, New York, Oct. 9, 1996. extracted from http://proquest.umi.com on internet Feb. 28, 2002.

Morgan, Rick, "When Used Right, Internet can be Effective Marketing Tool", Madison Capital Times, Madison, WI. Nov. 8, 1996. extracted from http://proquest.umi.com on internet on Feb. 28, 2002.

Edwards, Morris, "The Electronic Commerce Juggernaut", Communication News, Nokomis, Sep. 1997. vol. 34, Issue 9, extracted from http://proquest.umi.com on Internet on Feb. 28, 2002.

"HP and Cisco Deliver Internet Usage Platform and Billing and Analysis Solutions, New Platform and Solutions Allow ISPs and Carriers to Offer Value–added Services", Copyright 1998 Cisco Systems, Inc. http://www.cisco.com/warp/public145/pressroom/1998/apr98/28.html.

HP Smart Internet, "Transform User Data Into Revenue", Copyright Hewlett–Packard Company, 1999.

HP Smart Internet Usage Analysis Solution. "Transform User Data Into Competitve Advantage", Copyright Hewlett–Packard Company, 1999.

HP Cisco, Internet Usage Platform. "Transforming Internet Services Into Revenue" © Hewlett–Packard Co. 1998.

"Release Note for Netflow FlowCollector Release 2.0." © Jul. 1998 and "Release Notes for Netflow FlowAnalyzer Release 1.0" © Sep. 1997.

HP Invent. "Capturing the Usage Billing Advantage". Copyright 1994–2001. Hewlett Packard http://www.hp.com/communicationsusage/infolibrary/whitepapers/dsforumprint.html.

Anonymous, "Call Accounting Products", Teleconnect, vol. 15, No. 3, p. 89, Mar. 1997.

Deixler, Lyle, "Call Accounting Update", Teleconnect, vol. 15, No. 10, p. 87, Oct. 1997.

Deixler, Lyle, "Micro–Tel's Microcall for Windows 95/NT", Teleconnect, vol. 15, No. 12, p. 35, Dec. 1997.

Meteorology: Databases, "Inforonics offers controlled access to Web Meteorology", Information Today, Apr. 97, vol. 14 Issue 4, p53, 2p. This article reports that Inforonics has developed a controlled access gateway to MGA (Meteorological and Geoastrophysica).

Rosen,Michele, "BPCS steps into new millennium", Midrange Systems: Spring House: May 10, 1996. This article informs about the new release of BPCS Client Server Software as the most extensive upgrade of the product since 1980s. It incorporates onject tech.

Inoue et al., "Secure Mobile IP Using Security Primitives", IEEE 199.

Jainschigg, J., "Billing confirmed: this easy–to–use box turns guest calls into revenue." *Teleconnect*, vol. 12, No. 9, p. 39(4).

* cited by examiner

INTEGRATED INTERFACE FOR WEB BASED CUSTOMER CARE AND TROUBLE MANAGEMENT

CROSS-REFERENCE TO RELATED APPLICATIONS

This application is a continuation-in-part of U.S. Ser. No. 08/581,728 filed Dec. 29, 1995, entitled DIRECT DISPATCH, and claims the benefit of U.S. Provisional Patent Application U.S. Ser. No. 60/060,655, filed Sep. 26, 1997, entitled INTEGRATED CUSTOMER INTERFACE SYSTEM FOR COMMUNICATIONS MANAGEMENT.

FIELD OF THE INVENTION

The present invention relates generally to an internet enabled communications network fault management tool, and more specifically is directed toward a system and method for interactive trouble reporting and monitoring.

BACKGROUND OF THE INVENTION

To insure a high availability rate in communications network services provided to customers, service providers require accurate and responsive maintenance efforts. The network management services that support these maintenance efforts are a vital part of a service provider's marketability.

In conventional customer enabled maintenance systems, a connection is made with a large legacy system via a dial-up connection from a customer owned personal computer or work station. This connection frequently, although not always, emulates a terminal addressable by the legacy system. The dial-up access requires custom software on the customer workstation to provide dial-up services, communication services, emulation and/or translation services and generally some resident custom form of the legacy application to interface with the mid-range or mainframe computer running the legacy system.

There are several problems associated with this approach:

First, the aforementioned software is very hardware specific, and customers generally have a wide range of workstation vendors, which requires extensive inventory for distribution, and generally, intensive customer hand holding through initial setup and installation before reliable and secure sessions are possible. If the customer hardware platform changes through an upgrade, most of these issues need renegotiation.

Secondly, dial-up, modem, and communications software interact with each other in many ways which are not always predictable to a custom application, requiring extensive trouble shooting and problem solving for an enterprise wishing to make the legacy system available to the customer, particularly where various telephone exchanges, dialing standards or signal standards are involved.

Third, when an enterprise wishes to make more than one system available to the customer, the custom application for one legacy system is not able to connect to a different legacy system, and the customer must generally logoff and logon to switch from one to the other. The delivery technology used by the two legacy systems may be different, requiring different interface standards, and different machine level languages may be used by the two systems, as for example, the 96 character EBCDIC language used by IBM, and the 127 character ASCII language used by contemporary personal computers.

Finally, the security and entitlement features of the various legacy systems may be completely different, and vary from system to system and platform to platform.

It is therefore desired to provide connectivity to enterprise legacy systems over the public Internet, as the Internet provides access connectivity world wide via the TCP/IP protocol, without need to navigate various telephone exchanges, dialing standards or signal standards.

One such type of legacy system for the telecommunications industry is known as a fault management system which can provide a range of services to larger customers of the enterprise. A subset program within the fault management tools has been known to the public as "trouble tickets", the tool which allows a "trouble ticket" to be opened in response to a telecommunications network fault or a service problem.

In conventional dial-up trouble systems, service providers utilize trouble ticketing as a means for identifying reported network problems, failures, or customer inquiries. When a network problem, failure, or customer inquiry is reported, a trouble ticket describing the network problem, failure, or customer inquiry is opened. Generically, the trouble ticket is an electronic tracking mechanism that may exist as a data record in a database. In this example, the data record includes information describing the failure event, time of occurrence, etc.

In operation, the status of the trouble ticket is considered open as long as the network condition remains unresolved. At any given time, the collection of open trouble tickets represents the set of ongoing and future repair efforts of the service provider. This mechanism provides the service provider with a convenient method for identifying the status of current and future repair efforts.

Customers also desire access to this information. Generally, a customer's assessment of a particular network management service is not based solely upon the time frame of repair for the current network failure. In other words, the customer does not want to report a network problem, failure, or customer inquiry and passively wait for resolution. Customers desire information on the status of open trouble tickets.

Thus, what is needed is a system and method for allowing a customer to remotely access a service provider's trouble ticketing system. This remote access must enable a customer to seamlessly open a trouble ticket and identify the status of all trouble tickets pertaining to his organization.

Customers further desire an open access route to this information. The rapid adoption and use of the internet for data exchange has also prompted a desire on the part of customers to access their data over the internet.

SUMMARY OF THE INVENTION

The present invention is directed to a system and method for opening and tracking trouble tickets over the public Internet. A customer service management system provides information included within a customer profile record to a Web enabled infrastructure which is accessible by a remote customer workstation having a web browser and Internet access. The customer profile information is used to prepopulate data fields in dialogs used to open a trouble ticket. Once a trouble ticket is opened, the customer workstation tracks the existing trouble tickets through a browser based graphical user interface. The graphical user interface provides current and historical status reports of the actions taken to resolve a network event and the service organizations responsible for resolving the network event.

According to the preferred embodiment of the invention there is provided a trouble ticket management system for enabling an Internet enabled customer to generate a trouble ticket relating to a service provided by an enterprise to said customer, the system comprising an Internet enabled customer work station having a client web browser application forming an integrated interface for enabling IP communication between said customer and a network of said enterprise, said client application generating an object-oriented request message for generating a new trouble ticket based on a specified product and problem type; a process for authenticating said customer as having trouble ticket entitlement within said enterprise; a customer service management system for generating and tracking trouble tickets, said system having at least one database for identifying said customer and trouble ticket entitlement for said customer, each of said trouble tickets having multiple data fields; a transaction manager server for receiving said object-oriented request, generating a trouble ticket request transaction message in accordance with said received objects, communicating said request transaction message to said customer service management system for fulfilling said customer requests, and for downloading downloaded trouble ticket response data from said customer service management system, said transaction manager server further translating said downloaded trouble ticket response data into a trouble ticket object for communication to said integrated interface.

To generate a trouble ticket at a user's remote customer workstation, a user first logs on to the internet through any internet access route, and then logs on to the enterprise Web-server. After verification of the customer's entitlements to use the system, the Web-server downloads an available suite of services for that customer, which may include the trouble ticket tool, which is offered by the assignee of the present invention as the "Service Inquiry" service. This service is provided to the customer through a service object that is invoked and maintained by a browser based backplane, and which calls, as needed, other objects, including objects to enable graphical displays of data to the customer. From the opening screen, the customer may select the opportunity to open a new trouble ticket, and the Web-server will then download the service program object which will enable opening and generation of a trouble ticket.

At the time of customer verification, the nMCI Interact administrative server and customer order entry system ("StarOE") has obtained certain information relating to a customer profile maintained on StarOE server that provides authentication services for the present invention. This customer profile information may automatically prepopulate at least one field in a dialog involved in the opening of a trouble ticket. In this prepopulation process, data contained within the customer profile may be automatically entered into a field of a particular dialog. Through this prepopulation, the amount of required user input is minimized, thereby increasing customer usability. Additionally, the input efficiency provided by prepopulation allows the service organization to begin the trouble resolution process with minimal delay.

Upon downloading of the prepopulated trouble report from the web-server, the customer then enters information into a problem classification dialog. The problem classification dialog describes the type of network problem, failure, or customer inquiry (e.g., circuit or 800 number). After this problem classification dialog is completed, the user is prompted with questions that pertain to the network problem, failure, or customer inquiry described in the problem classification dialog. Both the questions and the corresponding answers may be entered into a remarks section of the trouble ticket.

Finally, the trouble ticket is submitted to the Customer Service Management System. When the CSM accepts the trouble ticket, a trouble ticket number is assigned.

Thereafter, the trouble ticket is displayed in a browser based frame through a object based graphical user interface that permits monitoring of all existing trouble tickets.

Additionally, the Service Inquiry object also allows the user to access an activities list that displays all actions and referrals for that trouble ticket. This chronological display provides a historical record of the activities taken by any organization within the service organization network. Finally, the graphical user interface allows the user to access the remarks section that displays all public comments associated with the trouble ticket.

Advantageously, the popularity of the public Internet provides a measure of platform independence for the customer, as the customer can run their own Internet web-browser and utilize their own platform connection to the Internet to enable service. This resolves many of the platform hardware and connectivity issues in the customers favor, and lets the customer choose their own platform and operating system.

BRIEF DESCRIPTION OF THE DRAWINGS

Further features and advantages of the invention will become more readily apparent from a consideration of the following detailed description set forth with reference to the accompanying drawings, which specify and show preferred embodiments of the invention, wherein like elements are designated by identical references throughout the drawings; and in which:

FIG. 7(*b*) is a diagram of the Service Inquiry application Server processes responsible for interfacing with the Custom Service Management System;

DETAILED DESCRIPTION OF THE INVENTION

The present invention is one component of an integrated suite of customer network management and report applications using a Web browser paradigm. Known as the networkMCI Interact system ("nMCI Interact") such an integrated suite of Web-based applications provides an invaluable tool for enabling customers to manage their telecommunication assets, quickly and securely, from anywhere in the world.

As described in co-pending U.S. patent application Ser. No. 09/159,695, the nMCI Interact system architecture is basically organized as a set of common components comprising the following:

1) an object-oriented software architecture detailing the client and server based aspect of nMCI Interact;

2) a network architecture defining the physical network needed to satisfy the security and data volume requirements of the networkMCI System;

3) a data architecture detailing the application, back-end or legacy data sources available for networkMCI Interact; and 4) an infrastructure covering security, order entry, fulfillment, billing, self-monitoring, metrics and support.

Each of these common component areas will be generally discussed hereinbelow. A detailed descriptions of each of these components can be found in a related, co-pending U.S. patent application Ser. No. 09/159,695, entitled INTEGRATED BUSINESS SYSTEM FOR WEB BASED TELECOMMUNICATIONS MANAGEMENT, the disclosure of which is incorporated herein by reference.

Figure 1:
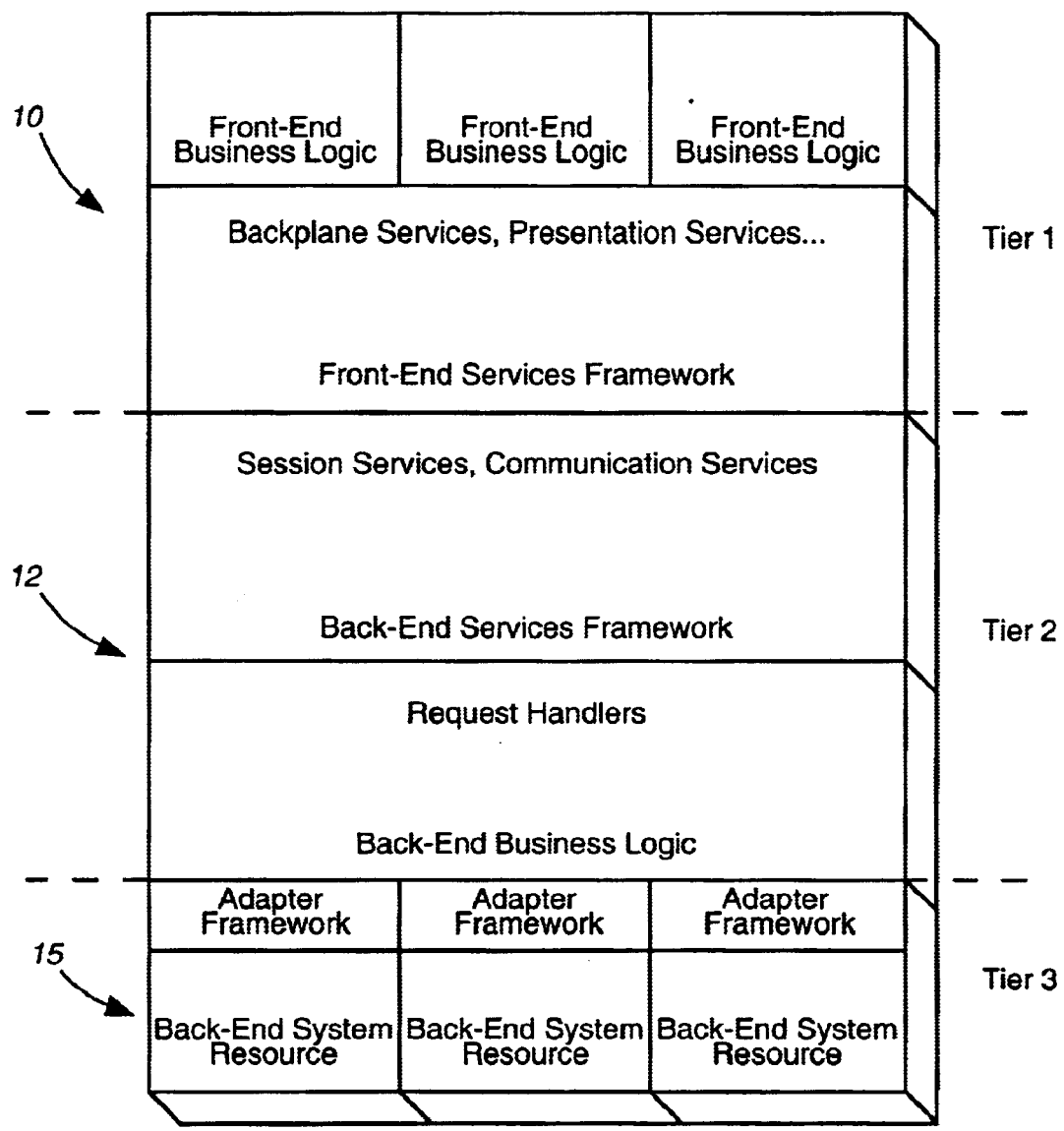
FIG. 1 illustrates the software architecture component of the nMCI Interact system comprising a three-tiered structure.

FIG. 1 is a diagrammatic illustration of the software architecture component in which the present invention functions. A first or client tier 10 of software services are resident on a customer work station 10 and provides customer access to the enterprise system, having one or more downloadable application objects directed to front end business logic, one or more backplane service objects for managing sessions, one or more presentation services objects for the presentation of customer options and customer requested data in a browser recognizable format and a customer supplied browser for presentation of customer options and data to the customer and for internet communications over the public Internet. Additionally applications are directed to front end services such as the presentation of data in the form of tables and charts, and data processing functions such as sorting and summarizing in a manner such that multiple programs are combined in a unified application suite.

A second or middle tier 12, is provided having secure web servers and back end services to provide applications that establish user sessions, govern user authentication and their entitlements, and communicate with adaptor programs to simplify the interchange of data across the network.

A third or back end tier 15 having applications directed to legacy back end services including database storage and retrieval systems and one or more database servers for accessing system resources from one or more legacy hosts.

Generally, as explained in co-pending U.S. patent application Ser. No. 09/159,515, filed entitled GRAPHICAL USER INTERFACE FOR WEB ENABLED APPLICATIONS, the disclosure of which is incorporated herein by reference thereto, the customer workstation includes client software capable of providing a platform-independent, browser-based, consistent user interface implementing objects programmed to provide a reusable and common GUI abstraction and problem-domain abstractions. More specifically, the client-tier software is created and distributed as a set of Java classes including the applet classes to provide an industrial strength, object-oriented environment over the Internet. Application-specific classes are designed to support the functionality and server interfaces for each application with the functionality delivered through the system being of two-types: 1) cross-product, for example, inbox and reporting functions, and 2) product specific, for example, toll free network management or Call Manager functions. The system is capable of delivering to customers the functionality appropriate to their product mix.

Figure 2:
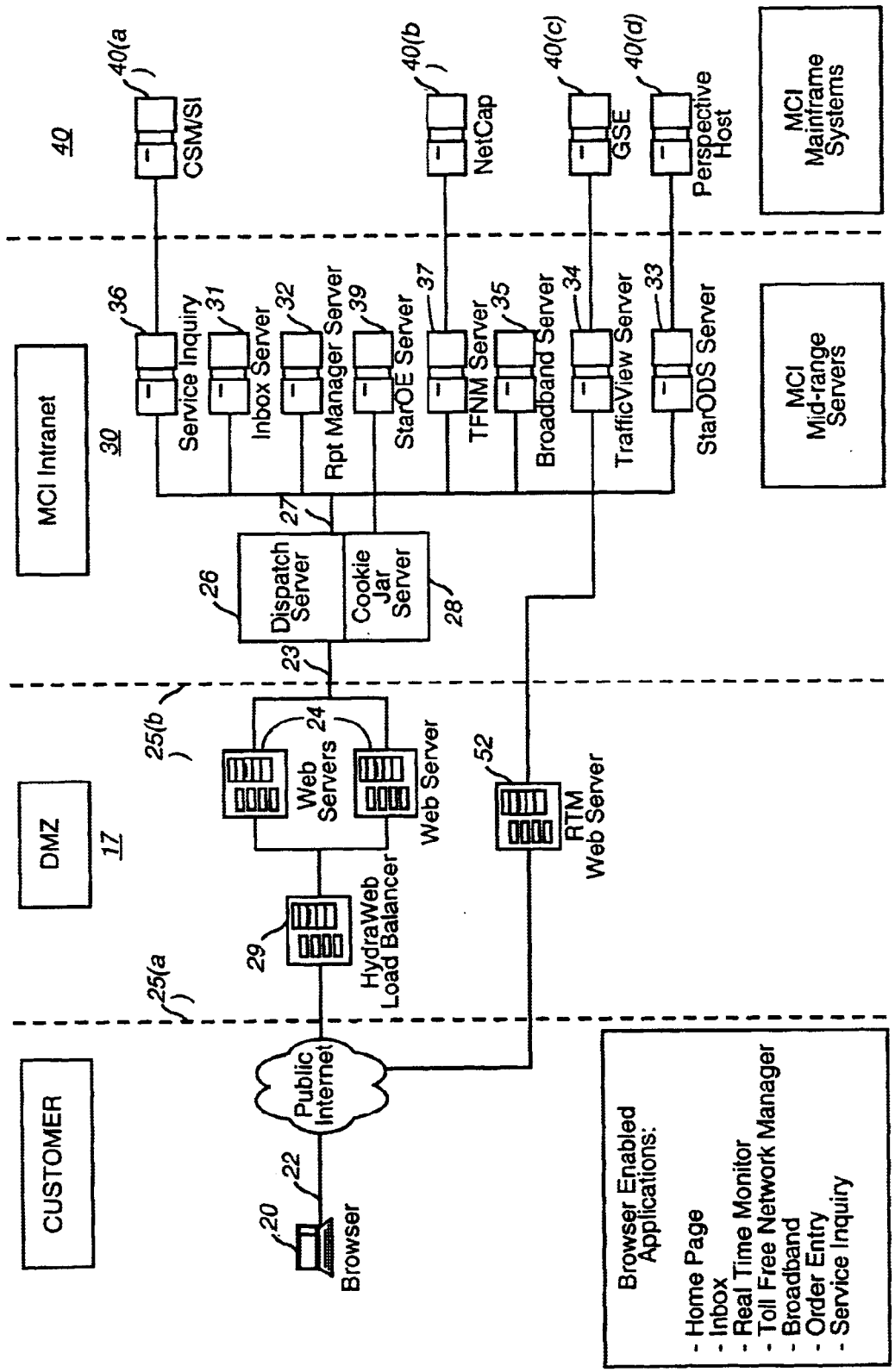
FIG. 2 is a diagrammatic overview of the software architecture of the networkMCI Interact system.

FIG. 2 is a diagrammatic overview of the software architecture of the networkMCI Interact system including: the Customer Browser (a.k.a. the Client) 20; the Demilitarized Zone (DMZ) 17 comprising a Web Servers cluster 24; the MCI Intranet Dispatcher Server 26; and the MCI Intranet Application servers 30, and the data warehouses, legacy systems, etc. 40.

Figure 3:
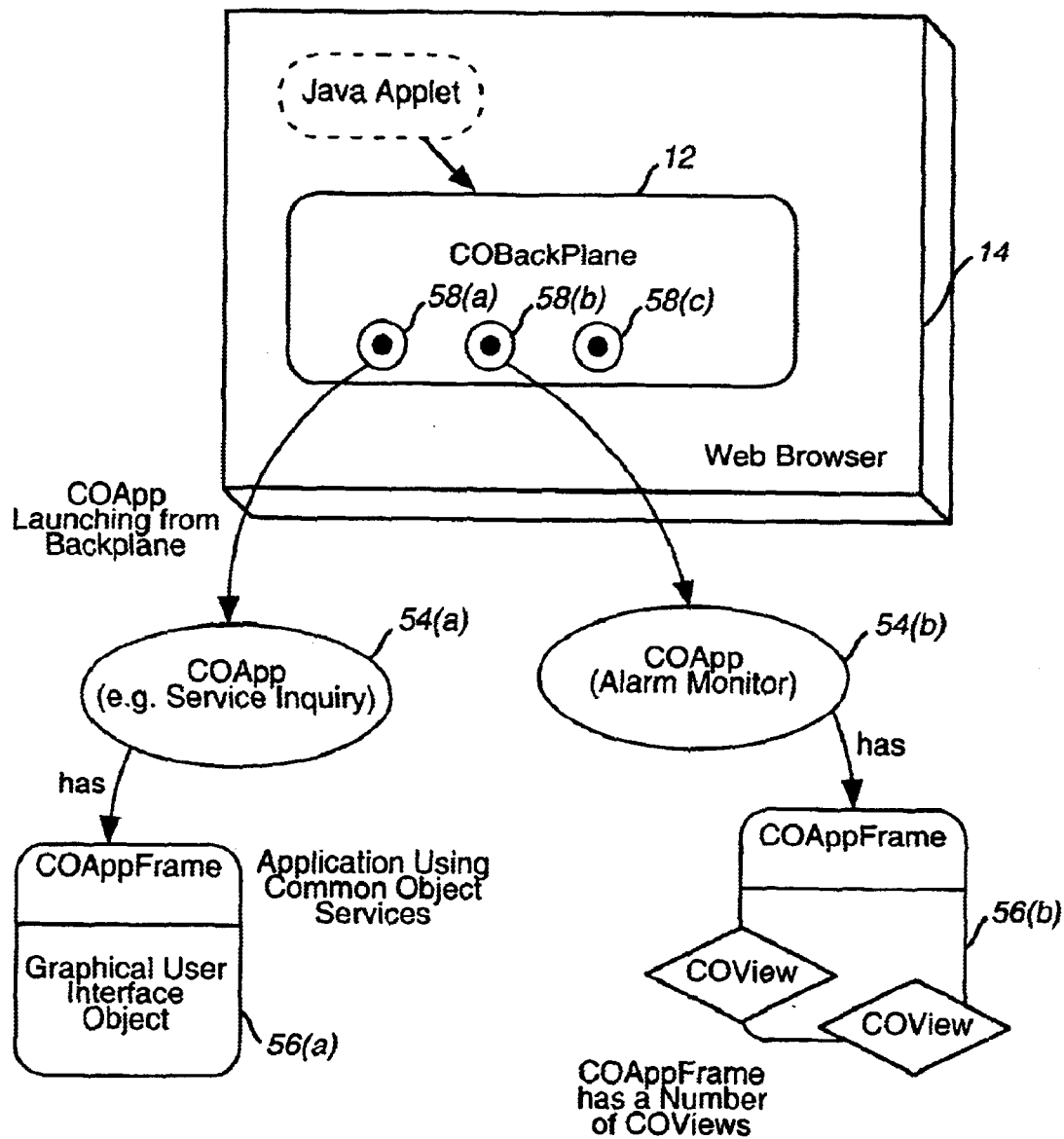
FIG. 3 is an illustrative example of a backplane architecture schematic.

The Customer Browser 20, is browser enabled and includes client applications responsible for presentation and front-end services. Its functions include providing a user interface to various MCI services and supporting communications with MCI's Intranet web server cluster 24. As illustrated in FIG. 3, and more specifically described in the above-mentioned, co-pending U.S. patent application Ser. No. 09/159,515, entitled GRAPHICAL USER INTERFACE FOR WEB ENABLED APPLICATIONS, the client tier software is responsible for presentation services to the customer and generally includes a web browser 14 and additional object-oriented programs residing in the client workstation platform 20. The client software is generally organized into a component architecture with each component generally comprising a specific application, providing an area of functionality. The applications generally are integrated using a "backplane" services layer 12 which provides a set of services to the application objects which provide the front end business logic and manages their launch. The networkMCI Interact common set of objects provide a set of services to each of the applications such as: 1) session management; 2) application launch; 3) inter-application communications; 4) window navigation among applications; 5) log management; and 6) version management.

The primary common object services include: graphical user interface (GUI); communications; printing; user identity, authentication, and entitlements; data import and export; logging and statistics; error handling; and messaging services.

FIG. 3 is a diagrammatic example of a backplane architecture scheme illustrating the relationship among the common objects. In this example, the backplane services layer 12 is programmed as a Java applet which can be loaded and launched by the web browser 14. With reference to FIG. 3, a typical user session starts with a web browser 14 creating a backplane 12, after a successful logon. The backplane 12, inter alia, presents a user with an interface for networkMCI Interact application management. A typical user display provided by the backplane 12 may show a number of applications the user is entitled to run, each application represented by buttons depicted in FIG. 3 as buttons 58a,b,c selectable by the user. As illustrated in FIG. 3, upon selection of an application, the backplane 12 launches that specific application, for example, Service Inquiry 54a or Alarm Monitor 54b, by creating the application object. In processing its functions, each application in turn, may utilize common object services provided by the backplane 12. FIG. 3 shows graphical user interface objects 56a,b created and used by a respective application 54a,b for its own presentation purposes.

Figure 4:
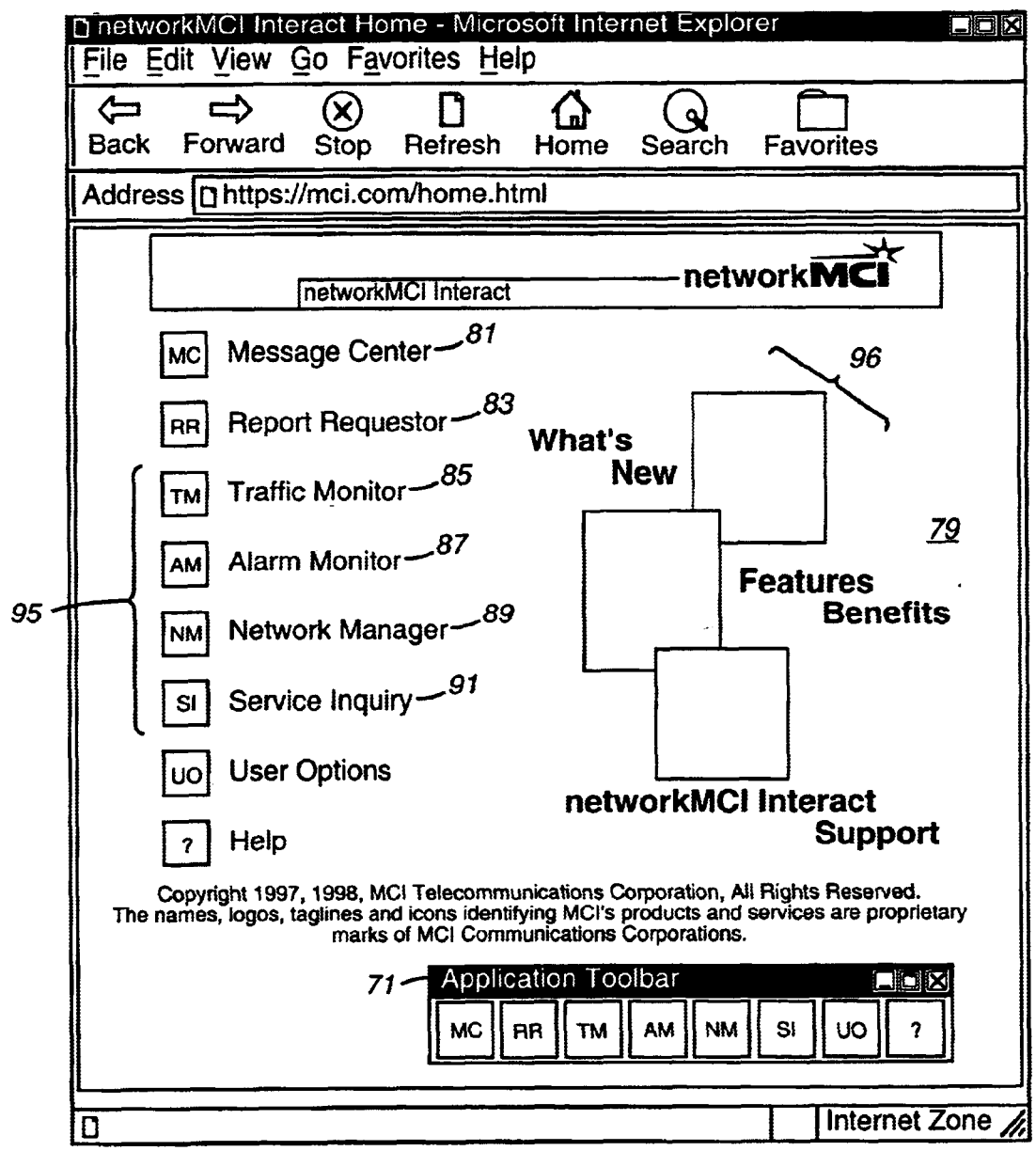
FIG. 4 illustrates an example client GUI presented to the client/customer as a browser web page.

FIG. 4 illustrates an example client GUI presented to the client/customer as a browser web page 80 providing, for example, a suite 95 of network management reporting applications including: MCI Traffic Monitor 85; an alarm monitor 87; a Network Manager 89 and Intelligent Routing 91. Access to network functionality is also provided through Report Requester 83, which provides a variety of detailed reports for the client/customer and a Message Center 81 for providing enhancements and functionality to traditional e-mail communications.

As shown in FIGS. 3 and 4, the browser resident GUI of the present invention implements a single object, COBackPlane which keeps track of all the client applications, and which has capabilities to start, stop, and provide references to any one of the client applications.

The backplane 12 and the client applications use a browser 14 such as the Microsoft Explorer versions 4.0.1 or higher for an access and distribution mechanism. Although the backplane is initiated with a browser 14, the client applications are generally isolated from the browser in that they typically present their user interfaces in a separate frame, rather than sitting inside a Web page.

The backplane architecture is implemented with several primary classes. These classes include COBackPlane, COApp, COAppImpl, COParm. and COAppFrame classes. COBackPlane 12 is an application backplane which launches the applications 54a, 54b, typically implemented as COApp. COBackPlane 12 is generally implemented as a Java applet and is launched by the Web browser 14. This backplane applet is responsible for launching and closing the COApps.

When the backplane is implemented as an applet, it overrides standard Applet methods init( ), start( ), stop( ) and run( ). In the init( ) method, the backplane applet obtains a COUser user context object. The COUser object holds information such as user profile, applications and their entitlements. The user's configuration and application entitlements provided in the COUser context are used to construct the application toolbar and Inbox applications. When an application toolbar icon is clicked, a particular COApp is launched by launchapp( ) method. The launched application then may use the backplane for inter-application communications, including retrieving Inbox data.

The COBackPlane 12 includes methods for providing a reference to a particular COApp, for interoperation.

For example, the COBackPlane class provides a getApp( ) method which returns references to application objects by name. Once retrieved in this manner, the application object's public interface may be used directly.

The use of a set of common objects for implementing the various functions provided by the system of the present invention, and particularly the use of browser based objects to launch applications and pass data therebetween is more fully described in the above-referenced, copending application GRAPHICAL USER INTERFACE FOR WEB ENABLED APPLICATIONS.

As shown in FIG. 2, the aforesaid objects will communicate the data by establishing a secure TCP messaging session with one of the DMZ networkMCI Interact Web servers 24 via an Internet secure communications path 22 established, preferably, with a secure sockets SSL version of HTTPS. The DMZ networkMCI Interact Web servers 24 function to decrypt the client message, preferably via the SSL implementation, and unwrap the session key and verify the users session.

After establishing that the request has come from a valid user and mapping the request to its associated session, the DMZ Web servers 24 will re-encrypt the request using symmetric encryption and forward it over a second secure socket connection 23 to the dispatch server 26 inside the enterprise Intranet.

As described in greater detail in co-pending U.S. patent application Ser. No. 09/159,514, entitled SECURE CUSTOMER INTERFACE FOR WEB BASED DATA MANAGEMENT, the contents and disclosure of which is incorporated by reference as if fully set forth herein, a networkMCI Interact session is designated by a logon, successful authentication, followed by use of server resources, and logoff. However, the world-wide web communications protocol uses HTTP, a stateless protocol, each HTTP request and reply is a separate TCP/IP connection, completely independent of all previous or future connections between the same server and client. The nMCI Interact system is implemented with a secure version of HTTP such as S-HTTP or HTTPS, and preferably utilizes the SSL implementation of HTTPS. The preferred embodiment uses SSL which provides a cipher spec message which provides server authentication during a session. The preferred embodiment further associates a given HTTPS request with a logical session which is initiated and tracked by a "cookie jar server" 28 to generate a "cookie" which is a unique server-generated key that is sent to the client along with each reply to a HTTPS request. The client holds the cookie and returns it to the server as part of each subsequent HTTPS request. As desired, either the Web servers 24, the cookie jar server 28 or the Dispatch Server 26, may maintain the "cookie jar" to map these keys to the associated session. A separate cookie jar server 28, as illustrated in FIG. 2 has been found desirable to minimize the load on the dispatch server 26. A new cookie will be generated when the response to the HTTPS request is sent to the client. This form of session management also functions as an authentication of each HTTPS request, adding an additional level of security to the overall process.

As illustrated in FIG. 2, after one of the DMZ Web servers 24 decrypts and verifies the user session, it forwards the message through a firewall 25b over a TCP/IP connection 23 to the dispatch server 26 on a new TCP socket while the original socket 22 from the browser is blocking, waiting for a response. The dispatch server 26 will unwrap an outer protocol layer of the message from the DMZ services cluster 24, and will reencrypt the message with symmetric encryption and forward the message to an appropriate application proxy via a third TCP/IP socket 27. While waiting for the proxy response all three of the sockets 22, 23, 27 will be blocking on a receive. Specifically, once the message is decrypted, the wrappers are examined to reveal the user and the target middle-tier (Intranet application) service for the request. A first-level validation is performed, making sure that the user is entitled to communicate with the desired service. The user's entitlements in this regard are fetched by the dispatch server 26 from StarOE server 39 at logon time and cached.

If the requestor is authorized to communicate with the target service, the message is forwarded to the desired service's proxy. Each application proxy is an application specific daemon which resides on a specific Intranet server, shown in FIG. 2 as a suite of mid-range servers 30. Each Intranet application server of suite 30 is generally responsible for providing a specific back-end service requested by the client, and, is additionally capable of requesting services from other Intranet application servers by communicating to the specific proxy associated with that other application server. Thus, an application server not only can offer its browser a client to server interface through the proxy, but also may offer all its services from its proxy to other application servers. In effect, the application servers requesting service are acting as clients to the application servers providing the service. Such mechanism increases the security of the overall system as well as reducing the number of interfaces.

The network architecture of FIG. 2 may also include a variety of application specific proxies having associated Intranet application servers including: a StarOE proxy for the StarOE application server 39 for handling authentication order entry/billing; an Inbox proxy for the Inbox application server 31, which functions as a container for completed reports, call detail data and marketing news messages, a Report Manager Proxy capable of communicating with a system-specific Report Manager server 32 for generating, managing and scheduling the transmission of customized reports including, for example: call usage analysis information provided from the StarODS server 33; network traffic analysis/monitor information provided from the Traffic view server 34; virtual data network alarms and performance reports provided by Broadband server 35; trouble tickets for switching, transmission and traffic faults provided by Service Inquiry server 36; and toll free routing information provided by Toll Free Network Manager server 37.

As partially shown in FIG. 2, it is understood that each Intranet server of suite 30 communicates with one or several consolidated network databases which include each customer's network management information and data. In the present invention the Services Inquiry server 36 includes communication with MCI's Customer Service Management legacy platform 40(*a*). Such network management and customer network data is additionally accessible by authorized MCI management personnel. As shown in FIG. 2, other legacy platforms 40(*b*), 40(*c*) and 40(*d*) may also communicate individually with the Intranet servers for servicing specific transactions initiated at the client browser. The illustrated legacy platforms 40(*a*)–(*d*) are illustrative only and it is understood other legacy platforms may be interpreted into the network architecture illustrated in FIG. 2 through an intermediate midrange server 30.

Each of the individual proxies may be maintained on the dispatch server 26, the related application server, or a separate proxy server situated between the dispatch server 26 and the midrange server 30. The relevant proxy waits for requests from an application client running on the customer's workstation 10 and then services the request, either by handling them internally or forwarding them to its associated Intranet application server 30. The proxies additionally receive appropriate responses back from an Intranet application server 30. Any data returned from the Intranet application server 30 is translated back to client format, and returned over the internet to the client workstation 10 via the Dispatch Server 26 and at one of the web servers in the DMZ Services cluster 24 and a secure sockets connection. When the resultant response header and trailing application specific data are sent back to the client browser from the proxy, the messages will cascade all the way back to the browser 14 in real time, limited only by the transmission latency speed of the network.

The networkMCI Interact middle tier software includes a communications component offering three (3) types of data transport mechanisms: 1) Synchronous; 2) Asynchronous; and 3) Bulk transfer. Synchronous transaction is used for situations in which data will be returned by the application server 40 quickly. Thus, a single TCP connection will be made and kept open until the full response has been retrieved.

Asynchronous transaction is supported generally for situations in which there may be a long delay in application server 40 response. Specifically, a proxy will accept a request from a customer or client 10 via an SSL connection and then respond to the client 10 with a unique identifier and close the socket connection. The client 10 may then poll repeatedly on a periodic basis until the response is ready. Each poll will occur on a new socket connection to the proxy, and the proxy will either respond with the resultant data or, respond that the request is still in progress. This will reduce the number of resource consuming TCP connections open at any time and permit a user to close their browser or disconnect a modem and return later to check for results.

Bulk transfer is generally intended for large data transfers and are unlimited in size. Bulk transfer permits cancellation during a transfer and allows the programmer to code resumption of a transfer at a later point in time.

Figure 5:
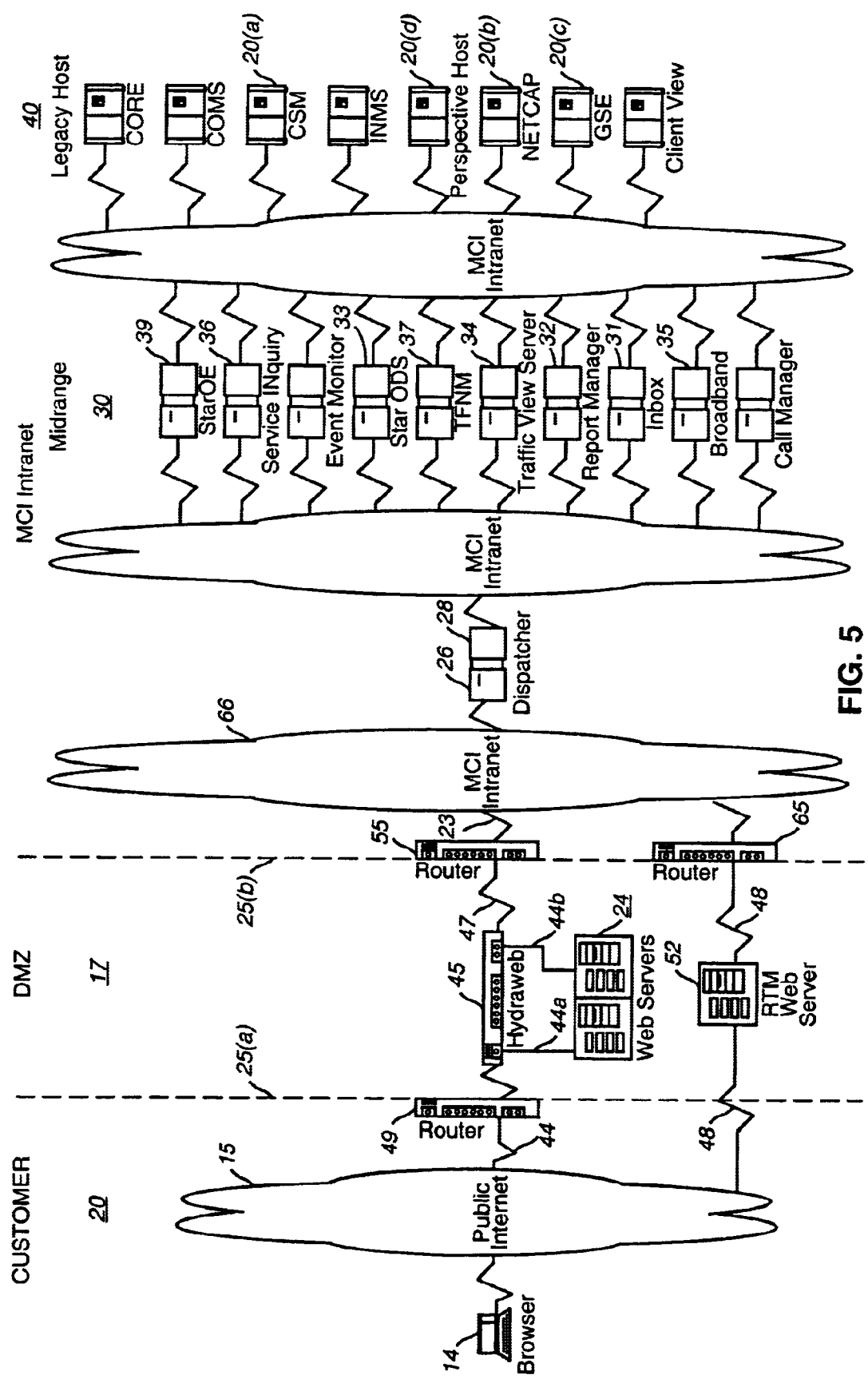
FIG. 5 is a diagram depicting the physical networkMCI Interact system architecture.

FIG. 5 is a diagram depicting the physical networkMCI Interact system architecture 100. As shown in FIG. 5, the system is divided into three major architectural divisions including: 1) the customer workstation 20 which include those mechanisms enabling customer connection to the Secure web servers 24; 2) a secure network area 17, known as the DeMilitarized Zone "DMZ" set aside on MCI premises double firewalled between the both the public Internet 25 and the MCI Intranet to prevent potentially hostile customer attacks; and, 3) the MCI Intranet Midrange Servers 30 and Legacy Mainframe Systems 40 which comprise the back end business logic applications.

As illustrated in FIG. 5, the present invention includes a double or complex firewall system that creates a "demilitarized zone" (DMZ) between two firewalls 25*a*, 25*b*. In the preferred embodiment, one of the firewalls 25*a,b* includes port specific filtering routers, which may only connect with a designated port on a dispatch server within the DMZ. The dispatch server connects with an authentication server, and through a proxy firewall to the application servers. This ensures that even if a remote user ID and password are hijacked, the only access granted is to one of the web servers 24 or to intermediate data and privileges authorized for that user. Further, the hijacker may not directly connect to any enterprise server in the enterprise intranet, thus ensuring internal company system security and integrity. Even with a stolen password, the hijacker may not connect to other ports, root directories or applications within the enterprise system.

The DMZ acts as a double firewall for the enterprise intranet because the web servers located in the DMZ never store or compute actual customer sensitive data. The web servers only put the data into a form suitable for display by the customer's web browser. Since the DMZ web servers do not store customer data, there is a much smaller chance of any customer information being jeopardized in case of a security breach.

As previously described, the customer access mechanism is a client workstation 20 employing a Web browser 14 for providing the access to the networkMCI Interact system via the public Internet 15. When a subscriber connects to the networkMCI Interact Web site by entering the appropriate URL, a secure TCP/IP communications link 22 is established to one of several Web servers 24 located inside a first firewall 25*a* in the DMZ 17. Preferably at least two web servers are provided for redundancy and failover capability. In the preferred embodiment of the invention, the system employs SSL encryption so that communications in both directions between the subscriber and the networkMCI Interact system are secure.

In the preferred embodiment, all DMZ Secure Web servers 24 are preferably DEC 4100 systems having Unix or NT-based operating systems for running services such as HTTPS, FTP, and Telnet over TCP/IP. The web servers may be interconnected by a fast Ethernet LAN running at 100 Mbit/sec or greater, preferably with the deployment of switches within the Ethernet LANs for improved bandwidth utilization. One such switching unit included as part of the network architecture is a HydraWEB™ unit 45, manufactured by HydraWEB Technologies, Inc., which provides the DMZ with a virtual IP address so that subscriber HTTPS requests received over the Internet will always be received. The Hydraweb unit 45 implements a load balancing algorithm enabling intelligent packet routing and providing optimal reliability and performance by guaranteeing accessibility to the "most available" server. It particularly monitors all aspects of web server health from CPU usage, to memory utilization, to available swap space so that Internet/Intranet networks can increase their hit rate and reduce Web server management costs. In this manner, resource utilization is maximized and bandwidth (throughput) is improved. It should be understood that a redundant Hydraweb unit may be implemented in a Hot/Standby configuration with heartbeat messaging between the two units (not shown). Moreover, the networkMCI Interact system architecture affords web server scaling, both in vertical and horizontal directions. Additionally, the architecture is such that new secure web servers 24 may be easily added as customer requirements and usage increases. The use of the HydraWEB™ enables better load distribution when needed to match performance requirements.

As shown in FIG. 5, the most available Web server 24 receives subscriber HTTPS requests, for example, from the HydraWEB™ 45 over a connection 44a and generates the appropriate encrypted messages for routing the request to the appropriate MCI Intranet midrange web server over connection 44b, router 55 and connection 47. Via the Hydraweb unit 45, a TCP/IP connection 23 links the Secure Web server 24 with the MCI Intranet Dispatcher server 26.

Further as shown in the DMZ 17 is a second real time monitor ("RTM") server 52 having its own connection to the public Internet via a TCP/IP connection 48. As described in greater detail herein, this RTM server provides real-time session management for subscribers of the networkMCI Interact Real Time Monitoring system. An additional TCP/IP connection 48 links the RTM Web server 52 with the MCI Intranet Dispatcher server 26.

With more particularity, as further shown in FIG. 5, the networkMCI Interact physical architecture includes three routers: a first router 49 for routing encrypted messages from the Public Internet 15 to the HydraWeb 45 over a socket connection 44; a second router 55 for routing encrypted subscriber messages from a Secure Web server 24 to the Dispatcher server 26 located inside the second firewall 25b; and, a third router 65 for routing encrypted subscriber messages from the RTM Web server 52 to the Dispatcher server 26 inside the second firewall. Although not shown, each of the routers 55, 65 may additionally route signals through a series of other routers before eventually being routed to the nMCI Interact Dispatcher server 26. In operation, each of the Secure servers 24 function to decrypt the client message, preferably via the SSL implementation, and unwrap the session key and verify the users session from the COUser object authenticated at Logon.

After establishing that the request has come from a valid user and mapping the request to its associated session, the Secure Web servers 24 (and RTM server) will re-encrypt the request using symmetric RSA encryption and forward it over a second secure socket connection 23 to the dispatch server 26 inside the enterprise Intranet.

As described herein, and in greater detail in copending U.S. patent application Ser. No. No. 09/159,695, the data architecture component of networkMCI Interact reporting system is focused on the presentation of real time (unpriced) call detail data, such as provided by MCI's TrafficView Server 34, and priced call detail data and reports, such as provided by MCI's StarODS Server 33 in a variety of user selected formats.

All reporting is provided through a Report Requestor GUI application interface which support spreadsheet, a variety of graph and chart type, or both simultaneously. For example, the spreadsheet presentation allows for sorting by any arbitrary set of columns. The report viewer may also be launched from the inbox when a report is selected.

A common database may be maintained to hold the common configuration data which can be used by the GUI applications and by the mid-range servers. Such common data will include but not be limited to: customer security profiles, billing hierarchies for each customer, general reference data (states, NPA's, Country codes), and customer specific pick lists: e.g., ANI's, calling cards, etc. An MCI Internet StarOE server will manage the data base for the common configuration of data.

Report management related data is also generated which includes 1) report profiles defining the types of reports that are available, fields for the reports, default sort options and customizations allowed; and 2) report requests defining customer specific report requests including report type, report name, scheduling criteria, and subtotal fields. This type of data will be resident in an Inbox server database and managed by the Inbox server.

The Infrastructure component of the nMCI Reporting system includes means for providing secure communications regardless of the data content being communicated. As described in detail in above-referenced, co-pending U.S. patent application Ser. No. 09/159,514, the nMCI Interact system security infrastructure includes: 1) authentication, including the use of passwords and digital certificates; 2) public key encryption, such as employed by a secure sockets layer (SSL) encryption protocol; 3) firewalls, such as 25 described above with reference to the network architecture component; and 4) non-repudiation techniques to guarantee that a message originating from a source is the actual identified sender. One technique employed to combat repudiation includes use of an audit trail with electronically signed one-way message digests included with each transaction.

Another component of the nMCI Interact infrastructure includes order entry, which is supported by the Order Entry ("StarOE") server. The general categories of features to be ordered include: 1) Priced Reporting; 2) Real-time reporting; 3) Priced Call Detail; 4) Real Time Call Detail; 5) Broadband SNMP Alarming; 6) Broadband Reports; 7) Inbound RTM; 8) Outbound RTM; 9) Toll Free Network Manager; and 10) Call Manager. The order entry functionality is extended to additionally support 11) Event Monitor; 12) Service Inquiry; 13) Outbound Network Manager; 14) Portfolio; and, 15) Client View.

The Self-monitoring infrastructure component for nMCI Interact is the employment of mid-range servers that support SNMP alerts at the hardware level. In addition, all software processes must generate alerts based on process health, connectivity, and availability of resources (e.g., disk usage, CPU utilization, database availability).

The Metrics infrastructure component for nMCI Interact is the employment of means to monitor throughput and volumes at the Web servers, dispatcher server, application proxies and mid-range servers. Metrics monitoring helps in the determination of hardware and network growth.

To provide the areas of functionality described above, the client tier 10 is organized into a component architecture, with each component providing one of the areas of functionality. As explained in further detail in co-pending U.S. patent application Ser. No. 09/159,515, the client-tier software is organized into a "component" architecture supporting such applications as inbox fetch and inbox management, report viewer and report requester, TFNM, Event Monitor, Broadband, Real-Time Monitor, and system administration applications. Further functionality integrated into the software architecture includes applications such as Outbound Network Manager, Call Manager, and Client View.

The present invention focuses on the middle-tier proxy and client application components that enable customers to create, status, and display service requests, i.e., trouble tickets, to the enterprise service provider (MCI). Particularly, through a client application GUI, customers have the ability to create and query trouble tickets ("tickets").

FIG. 2 illustrates the service inquiry "SI" application server 36 interfacing with a backend Customer Service Management" ("CSM") legacy host system 40(a). The SI application server component 36 includes processes for handling all requests made of Service Inquiry by the customer (as relayed via the Dispatcher 26). Specifically, requests are handed off to Service Inquiry back-end processes and responses are received from the Service Inquiry back-end processes to be routed back through the Dispatcher to the client workstation web browser 20.

As will be described, the major components of the nMCI Interact Service Inquiry application include: the Graphical User Interface (GUI) or client application component which is preferably a Java application, e.g., "JDK" 1.1.5, providing outside customers, e.g., large corporate accounts, with the ability to manage trouble tickets for MCI services and products; and, an Infrastructure component which includes: the Common Object Framework, including use of the nMCI Interact platform client communication (common objects) package including the mechanisms for delivering messages from the client (GUI) to the SI application server; the Model-View-Controller (MVC) framework, and a Service Inqiuiry (SI) application server framework detailing client and server communications packages providing the interaction between the networkMCI Interact platform and Service Inquiry application. As will be described, the application server package includes a thread pooling mechanism and transaction manager, and, together with the client communications package, supports both synchronous and asynchronous transactions.

Additionally, as will be described, the overall Domain Object Model implemented in Service Inquiry includes classes representing the business components of Service Inquiry including context areas such as: 1) QuestionTree Construction, i.e., the objects invoked to enable a system administer to create trouble ticket questions that enables a customer to open a trouble ticket; 2) Trouble Ticket construction, i.e., the objects invoked to enable customers to create trouble tickets via their web browser interface; 3) QuestionTree Usage, i.e., the objects invoked to enable customers to navigate through screen dialogs displays when creating trouble tickets; and, 4) Trouble Ticket Query, i.e., the objects invoked that enable customers to obtain status and details regarding their trouble tickets.

As in any of the above-described nMCI Interact suite of telecommunications network applications, the Service Inquiry application utilizes the Common Objects application framework (COF) to inter-operate with the networkMCI Interact backplane and integrate with the other elements of the networkMCI Interact architecture. The Common Objects framework is utilized to leverage existing infrastructure services such as logon and authentication, such as described in commonly owned, copending U.S. patent application Ser. No. 09/159,408 entitled AUTHENTICATION AND ENTITLEMENTS FOR USERS OF WEB BASED DATA MANAGEMENT PROGRAMS, the contents and disclosure of which is incorporated by reference as if fully set forth herein, and transaction management and security, such as described in commonly owned, copending U.S. patent application Ser. No. 09/159,514 entitled SECURE CUSTOMER INTERFACE FOR WEB BASED DATA MANAGEMENT, the contents and disclosure of which is incorporated by reference as if fully set forth herein.

Particularly, the Service Inquiry application extends the COAppImpl class in order to inter-operate with the Interact backplane and other networkMCI Interact applications (as required), and, includes one or more screens derived from the COAppFrame class. Most of the high level classes dealing with the initiation of transactions are utilized by Service Inquiry. The COClientSession class is available to the Service Inquiry application upon successful login to the networkMCI Interact system and is utilized for session management (e.g., connect, disconnect, and logoff). The family of COTransaction classes is used to send and receive messages to the backend Service Inquiry service. These classes include CONonblockTransaction, COSynchTransaction, and COAsynchTransaction and, a COBulkTransaction may also be used if necessary. Additionally, the SI may utilize all of the COCommunications classes as well as utilize the data import and export facilities of the Common Objects to perform local file I/O. Service Inquiry assumes it will be trusted since the networkMCI Interact platform assumes the responsibility of signing the applets. Service Inquiry implements the COImportable and COExportable interfaces to retrieve local resource for writing and reading. Service Inquiry may also utilize a COAppLog class to perform local logging.

As mentioned, the Service Inquiry application enables retrieval of pre-filtered customer tickets and caching of data for later presentation to the query screens during the lifetime of a Service Inquiry session. The initial bulk transfer and caching greatly reduces response times for each query transaction.

In order to have the capability to access local resources, Service Inquiry utilizes the Common Object security model as part of the networkMCI Interact architecture and retrieves the existing security manager from the networkMCI Interact backplane. Thus, SI classes are packaged into CAB files and signed such that SI may interact with security manager to access trusted resources.

To access the Service Inquiry application, a customer first accesses the networkMCI Interact home page (not shown), at which time the COBackPlane is downloaded and loaded by the Java Class Loader by the browser and presented to the user along with a logon screen (not shown). The logon screen is normally part of the COBackPlane code, i.e., the logon screen is launched by the COBackPlane. The COBackPlane extends the Applet class and thus contains an init( ) method. Inside the init( ) method, all the available networkMCI Interact applications are registered by name by calling the addAvailableApp(String) method defined within COBackPlane. For example, to add Service Inquiry, the addAvailableApp("ServiceInquiry") is invoked. Once the user enters logon information, e.g., username and password, this information is sent to the StarOE server 39 for authentication. Once the logon process is successful, a COClientSession is created and can be used to perform transactions or get user information such as the COUser object.

The COBackPlane object then puts up the web page screen display of FIG. 4 that contains the application list 95 and the toolbar with a button for each application for which the user has access to. When the user selects the Service Inquiry icon 91 from the application list (FIG. 4), the COBackPlane loads the class by name and instantiates the class by invoking "Class.forName("ServiceInquiry) .newInstance( )". Then COBackPlane creates a new thread (an instance of the COAppStartThread) and this thread is associated with the launched application. The COAppStartThread then invokes the start( ) method of the service inquiry application. All networkMCI Interact applications extend the COAppImpl class that defines a start( ) method that each subclass is responsible for implementing.

Anytime after a successful login and a creation of the COClientSession object, the application may obtain more information by invoking methods defined in the COClientSession class. Some of this information is COUser, locale, and a list of applications the user is entitled to utilize (entitlements). The COUser may be obtained through the COClientSession by calling "session.getUser( )". The object initially only contains the username, password and a list of applications the user is entitled to. Additional information can be retrieved from StarOE and used to populate the COUser that can function like a cache for later use.

In an alternate embodiment, user profile information, e.g., name, phone number, security levels, etc., may be directly communicated from StarOE to the SI application server via a server-to-server TCP/IP socket level transaction.

The COClientSession is the source all transactions. This class is used to connect to the backend application server and perform all the different transaction types (synchronous and asynchronous supported by Service Inquiry).

Figure 6:
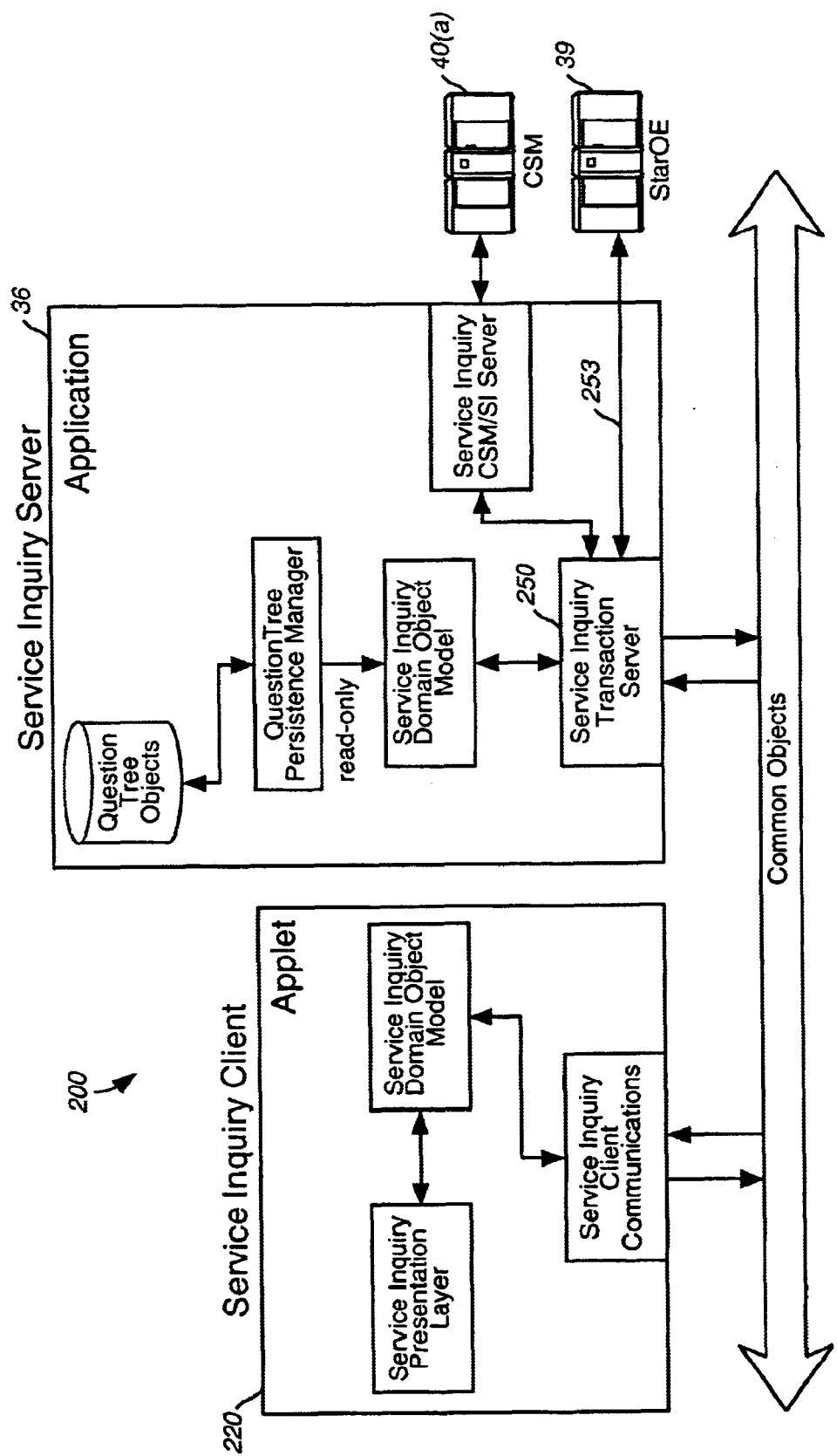
FIG. 6 is a diagram depicting the overall logical Service Inquiry application architecture of the present invention.

FIG. 6 illustrates the high-level design of the Service Inquiry application 200 including the client application 220 and SI application server 36 components. As described, Service Inquiry requires integration with a number of external systems and utilizes the Common Objects Framework for inter-application communications. Interfacing with the Service Inquiry application server 250 via the common objects framework are the StarOE server 39, e.g., for user profile information, as well as other Service Inquiry specific data, and, the CSM legacy host 40(*a*) that provides the ability to query, status, and take action on service inquiries. It should be understood that communications between the SI server 36 and StarOE may be via TCP/IP connection 253. Communication between the SI application server 36 and CSM 40(*a*) is via Registry middleware, such as described in commonly owned, co-pending U.S. patent application Ser. No. 08/560,550 incorporated by reference herein. The above-referenced Registry system has a number of options for inter-application communication, including both Java and CORBA interfaces.

The Service Inquiry client communications and application server packages provide the framework for transporting client messages to the mid-tier application server for invocation of domain objects. The domain objects encapsulate the logic to translate the actual client messages and deliver the request to the backend services. The response from the backend service is then received by the application server and returned to the originating client.

Figure 7A:
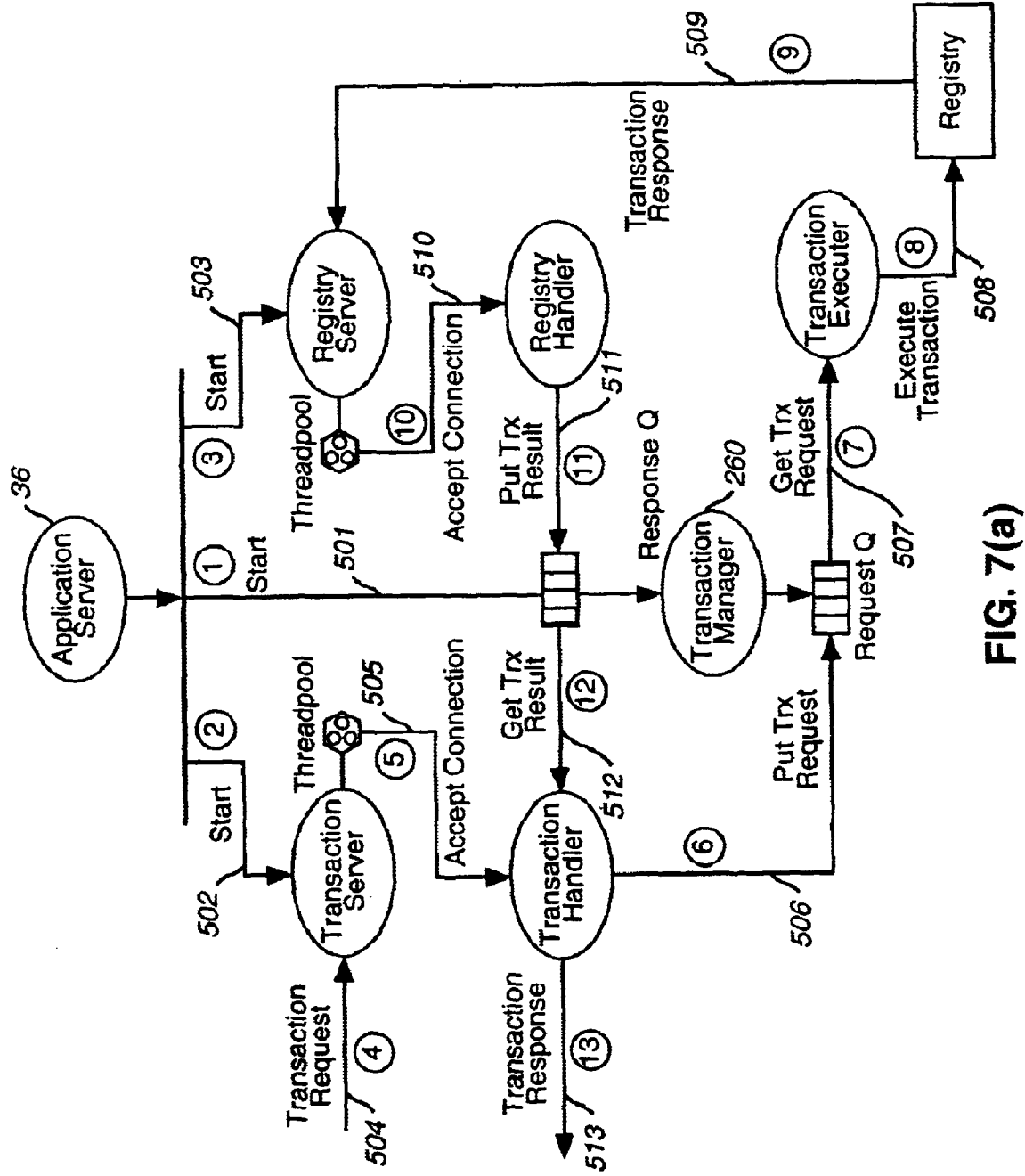
FIG. 7(*a*) is a diagram of the Service Inquiry application server architecture.
Figure 7B:
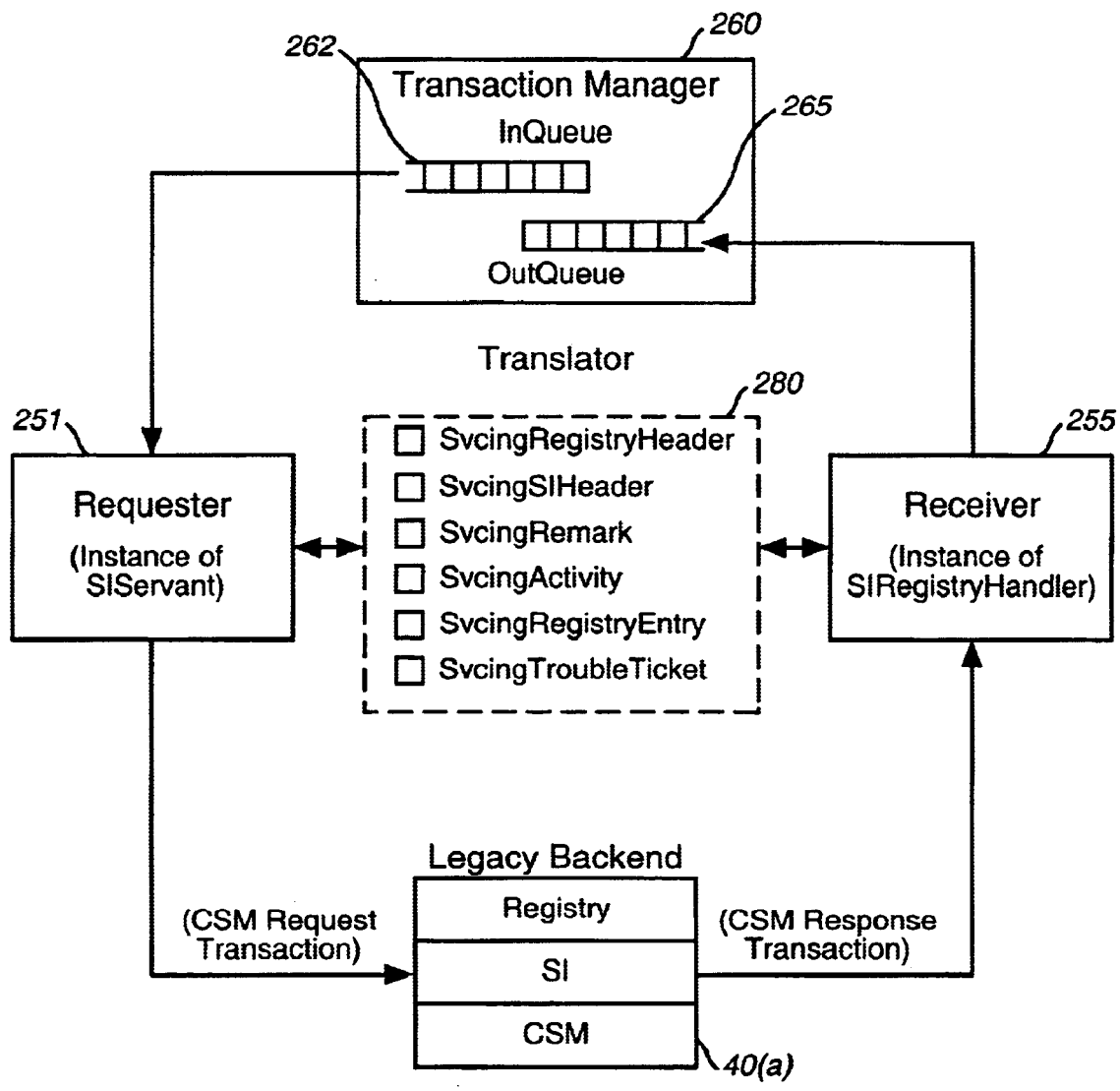

The SI application server 36 interfaces with the Legacy Backend 40(*a*), CSM/SI through a SvcInqCSMRequester "Requester" object 251 and Receiver object 255, as shown in FIG. 7(*b*), which primarily handles communication with Registry communication middleware. Particularly, the Requester object 251 is the class that represents the requester which takes the request data that comes from the Front-End/Client application through a Transaction Manager 260, builds the CSM/SI request transactions by interacting with the Translator classes 280 and ships off the requests to CSM. The request data that comes from the Front End/Client is an array of strings that are required from the customer for the request to be made. Minimal information is passed from the client to reduce the communication overhead from the client to the SI application server. All other information is packaged in the Requester 251.

The translator class 280 is used to facilitate the use of the formatting behaviors of the Registry classes and the Header classes and is responsible for: creating correctly formatted CSM/SI transactions from Service Inquiry objects; and, creating ServiceInquiry objects from the results of the CSM/SI transactions. That is, the translator 280 coordinates activities and collaborate with the Registry classes and Header classes. Particularly, the Requester object 251 invokes the SvcInqRegistryHeader and SvcInqSIHeader classes in the Translator 280 to build the "Registry Header" and "SI Header" strings that are required for the CSM/SI request transactions for implementing Service Inquiry functionality, as will be explained in further detail. It also talks to the SvcInqActivity or the SvcInqRemarks classes to build the data portion of the CSM/SI requests. Once the CSM/SI Transaction String is formatted the actual request to the CSM legacy is made. Sending the transaction to CSM's Standard Interface (SI) via Registry classes does this.

The Receiver object is an instance of the SIRegistryHandler class whose responsibility is to obtain the responses from CSM, parse the response, strip off the headers and build objects from the response data, by interacting with the Translator classes 280. Particularly, it uses the SvcInqRemark, the SvcInqActivity, the SvcInqTroubleTicket or the SvcInqRegistryEntry class in the Translator to build the remarks, activity, detail or list of Ticket objects from the response string that is received from CSM. The built object is then sent back to the Transaction Manager 280 who passes it back to the Front-End/Client.

FIG. 7(*a*) illustrates a flow diagram depicting the execution of a transaction by the SI application server 36 with each bubble representing a separate thread. First, at step 501, the SI Application Server 36 instantiates and starts the Transaction Manager 260 in a separate thread. The SI Application Server then instantiates and starts the Transaction Server 250 in a separate thread at step 502. The SI Application Server 36 instantiates and starts the Registry Server in a separate thread at step 503.

More particularly, as shown in FIG. 7(*a*), the Transaction Server receives a client transaction request, as shown at step 504. The connection is accepted and Transaction Handler thread is removed from the thread pool for execution, as indicated at 505. The Transaction Handler unpackages the transaction request at step 506 and puts the request message into the Transaction Manager's RequestQ. The Transaction Manager 260 removes the request message from its RequestQ at step 507 and spawns a Transaction Executer thread to execute the transaction. Then, at step 508, the Transaction Executer translates the message and executes the transaction by loading the domain class and invoking the specified method which send the request to the backend services.

As indicated at step 509, the backend service responds by sending the result of the transaction to the Registry Server which accepts the connection. At step 510, a Registry Handler is removed from the thread pool for execution for performing translation of the received message and placing the result into the Transaction Manager's ResponseQ, as indicated at step 511. The Transaction Handler retrieves the transaction result from the ResponseQ at step 512 and the transaction response is delivered to the client at step 513.

The mainframe legacy backend 40(*a*) "Registry" is the cross-platform communication mechanism that is used by Service Inquiry to send messages to and receive messages from the CSM host. It shields applications from network protocols. CSM is provided with a mainframe database (not shown) that provides a set of Transactions to request CSM information through its Standard Interface (SI) which uses Registry as the messaging system. The Service Inquiry Application Server 250 is configured to communicate asynchronously with CSM using Registry's RQS as the Inter-Process Communication (IPC) mechanism. Since CSM supports only one-way messaging, the communication between Service Inquiry and CSM/SI is asynchronous. When CSM 40(*a*) receives a request from the Requester, it does not send any acknowledgment back to the requester. The requester only receives a confirmation from Registry that the request was successfully sent. When CSM finishes processing the request, it sends the response to the Receiver object 255 (FIG. 7(*b*)).

Registry configuration consists of configuring the Registry client which sends request messages to CSM from the Service Inquiry Requester and Registry server that receives responses from CSM and passes it to the Service Inquiry Receiver. As shown in FIG. 7(*b*), the Registry Queuing system, RQS is an asynchronous mode of inter process communication where there is one queue on the client and one on the server and there is only one TCP/IP connection always open between the client and the server. The client puts its requests on its own local queue 262 and it is then forwarded to the queue on the server. The server takes the request off the queue, processes the request and the response messages are put in the client's queue 265. Since there is only one TCP/IP connection at any given time between the client and the server this mode is very efficient in terms of both network and system resources.

As in the other applications of the nMCI Interact suite, the Service Inquiry client application is written as a Java application to be executed at the client web browser 14 running, for example, Microsoft Internet Explorer 4.0 (FIG. 2). The Service Inquiry client is started from the networkMCI Interact homepage upon selection of the service inquiry icon 91 shown in the home page 79 of FIG. 4.

FIG. 8(*a*) illustrates an example service inquiry main screen 240 presented upon entry into the SI system selection. As shown in FIG. 8(*a*), the Service Inquiry display 240 presents a title bar, menu bar 241, tool bar 245, work area, and message window to provide the user alternative ways to manage different components of Service Inquiry product. It should be understood that any action available from the tool bar will also be available within the menu bar. Preferably, there are two permission levels that a user can have: 1) a View permission allowing a user to view the Service Inquiry application desktop (Default Query), define Service Inquiry queries, view the details, remarks and activities, print, and report trouble tickets via StarWRS web-based reporting service; and, 2) an edit permission allowing a user to create trouble tickets, refer out trouble tickets, close trouble tickets, add remarks to trouble tickets, and, update trouble tickets.

In further view of FIG. 8(*a*), the menu bar 241 consists of the following items that correspond to the associated functionality: a File option 241*a* including selections for creating a new ticket or new query, opening an existing query, saving a query being edited; printing and exiting the SI service; an Edit option 241*b* including selections for querying on a specific ticket number, closing a currently selected ticket, or referring back to a currently selected ticket; a View option 241*c* including selections for showing details, remarks, or activities of a currently selected ticket, and for refreshing current query results; a Tools option 241*d* including selections for sorting tickets in the active window; and, a Help option. The tool bar 245 provides a Create button 246 for creating a new ticket, a Query button 247 for generating a new query, a find button 248 enabling queries on a specific ticket number and, a refresh button 249 for refreshing the ticket pool.

The Query component of the Service Inquiry application enables Service Inquiry users to query trouble ticket information within the system, i.e., the listing or viewing of tickets based on, e.g., different selection criteria. This component also provides users with the ability to add remarks to tickets. A Default Query functionality is provided that allows users to keep a dedicated query available at all times. This query enables users to monitor the subset of tickets that are of most interest to them. A refresh mechanism is additionally provided so that the user may keep up with as current a status of these tickets as needed. The Default Query may be executed and displayed immediately on startup of the Service Inquiry application and is available throughout the Service Inquiry session. Preferably, the Service Inquiry application includes a set of predefined queries, one of which is preset as the Default Query and which may be redefined at any time. The user can only set their Default Query from a saved query.

To create a new query, e.g., upon selection of the "Query" button 247 from the tool bar 245, a "Criteria" window is displayed such as the example window display 270 shown in FIG. 8(*b*) which enables the customer to select from among the following criteria to be used in the query: priority, status, identifier, open date, and ticket number. As criteria are selected from the "CRITERIA" tab 272, new tabs (not shown) appear that are associated with the selected criteria. It is from these tabs that the actual parameters are specified for which the query is executed against. As the query is built, the parameters that are selected populate themselves in the table 274 to the right of the tabbed panel. At any point in this selection process, the user may perform the following: move back and forth to any criteria tab by selecting the "Back" and "Next" buttons 276*a*, 276*b* respectively, or selecting the desired tab directly; add or remove criteria tabs by selecting or deselecting the associated checkbox from the "CRITERIA" tab 272; execute the query by selecting the "submit" button 276*c;* save the query by selecting the "Save As" button 276*d;* remove highlighted parameters in the table by selecting the "Remove" button 276*e;* or, remove all parameters in the table by selecting the "Remove All" button 276*f*.

When executing a trouble ticket query, a "List Tickets by Status Request" transaction is communicated via Registry to the CSM legacy system to provide all the tickets for a given organization (ORG) code with the requested status and created after a specified date. CSM returns the list of tickets via a "List Ticket-Status Response" Transaction. The ORG code to be passed in this transaction is one of the selection criteria representing the originating organization or the organization where the ticket was created. The customer may choose from a list of ORGs that the customer has authority over and a primary ORG is obtained from every customer and is stored locally in the user profile. As mentioned, the resulting information from all of the tickets is cached for future processing. Generally, only one type of status may be specified in a single request: Open, Closed, Referred or Cancelled status. If a customer has authority over more than one organization that customer is able to view tickets for any organization he/she has authority over. If a customer has access to a primary organization, then he/she has implied access to all the subordinate organizations meaning that the request will apply to the subordinate organizations as well. Furthermore, this transaction may only display some of the details/fields of the tickets which means that the data cached from this request may only be used to process the Queries on these tickets. It cannot be used to view all the details of the tickets for which further CSM/SI transactions will have to be made.

Appendix A provides the general format of a "List Ticket-Status Request" Transaction and corresponding "List Ticket-Status Response" Transaction.

Figure 8A:
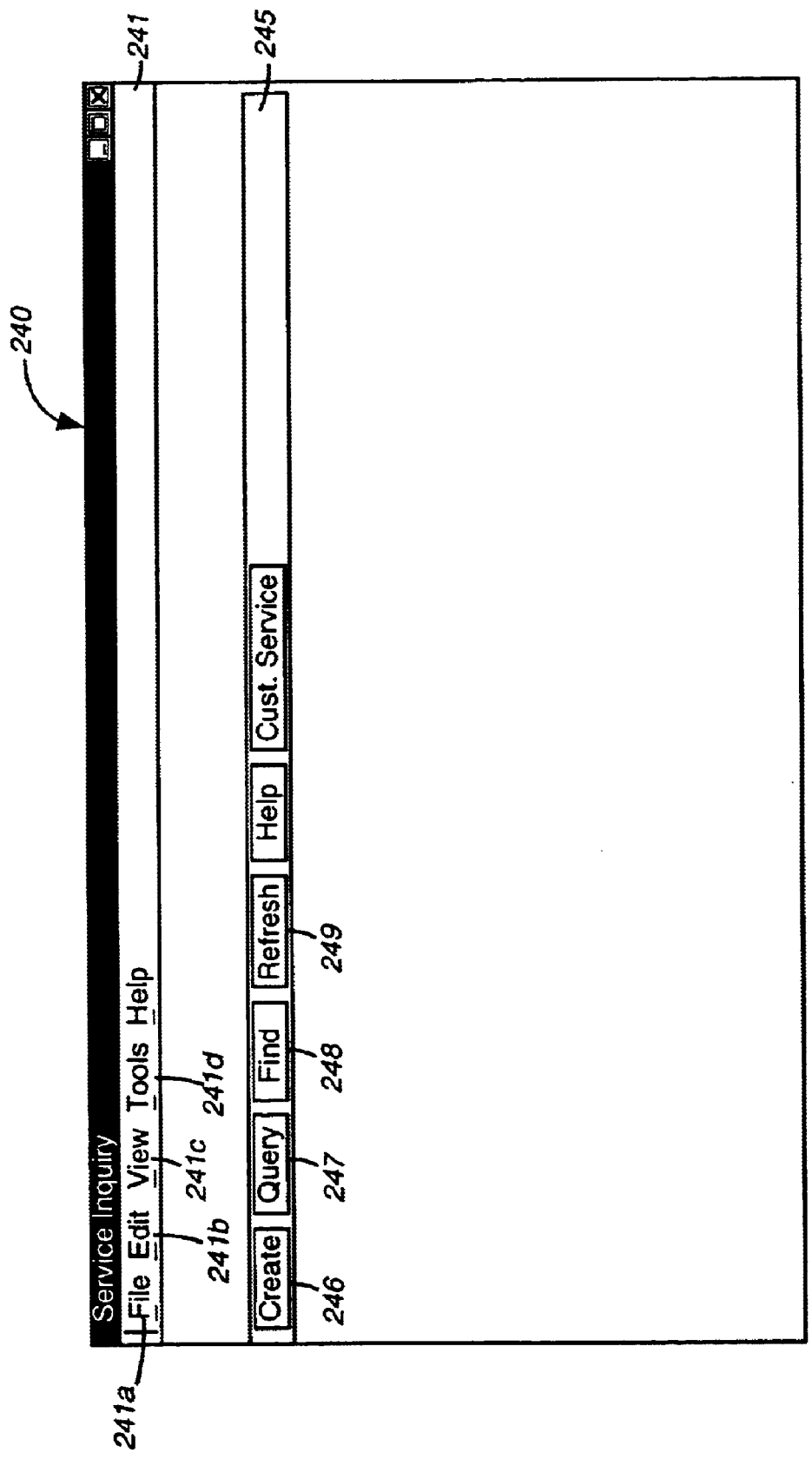
FIGS. 8(*a*)–8(*k*) illustrate various graphical user interfaces that may be presented to a customer for opening a new and querying an existing trouble ticket.
Figure 8B:
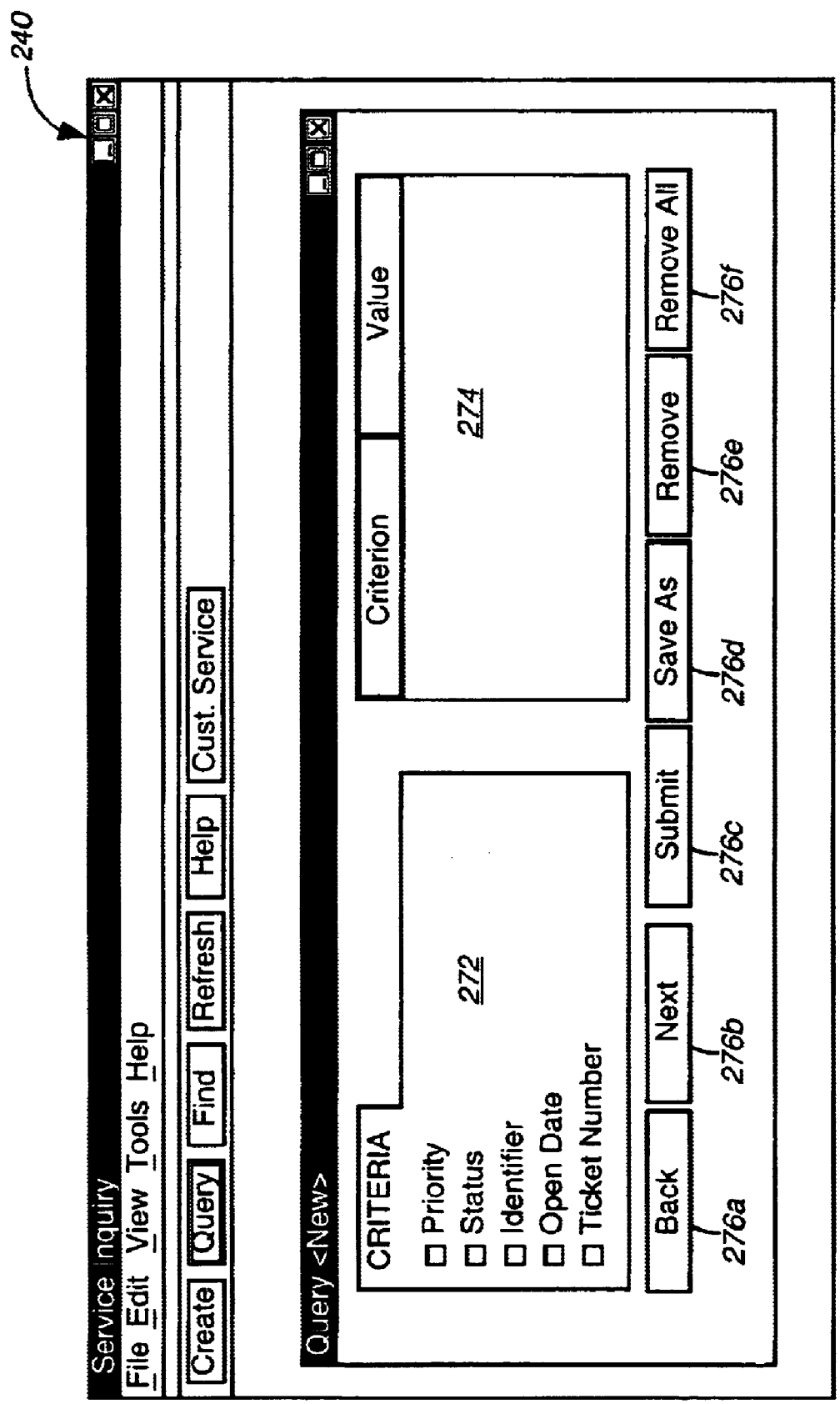
Figure 8C:
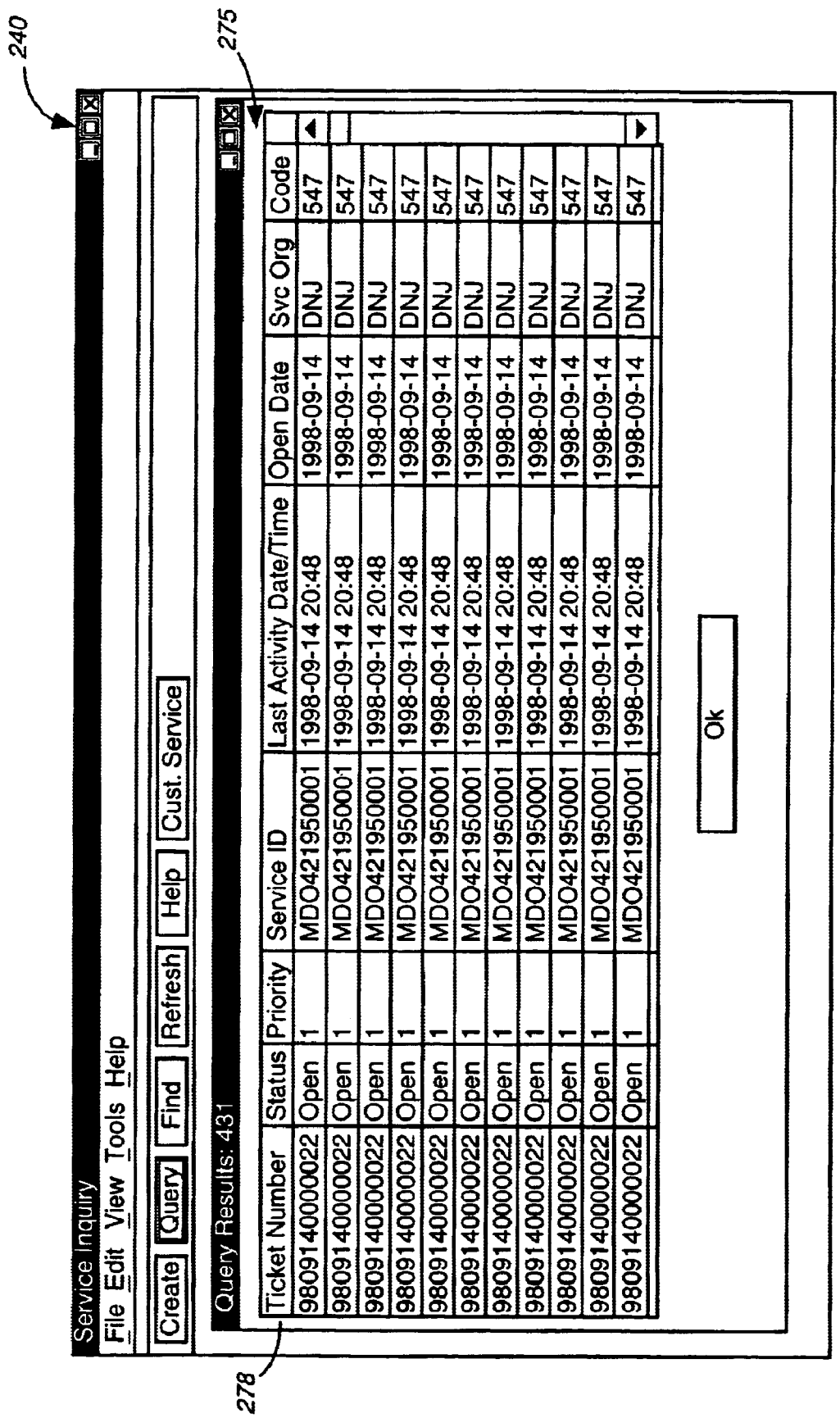
Figure 8D:
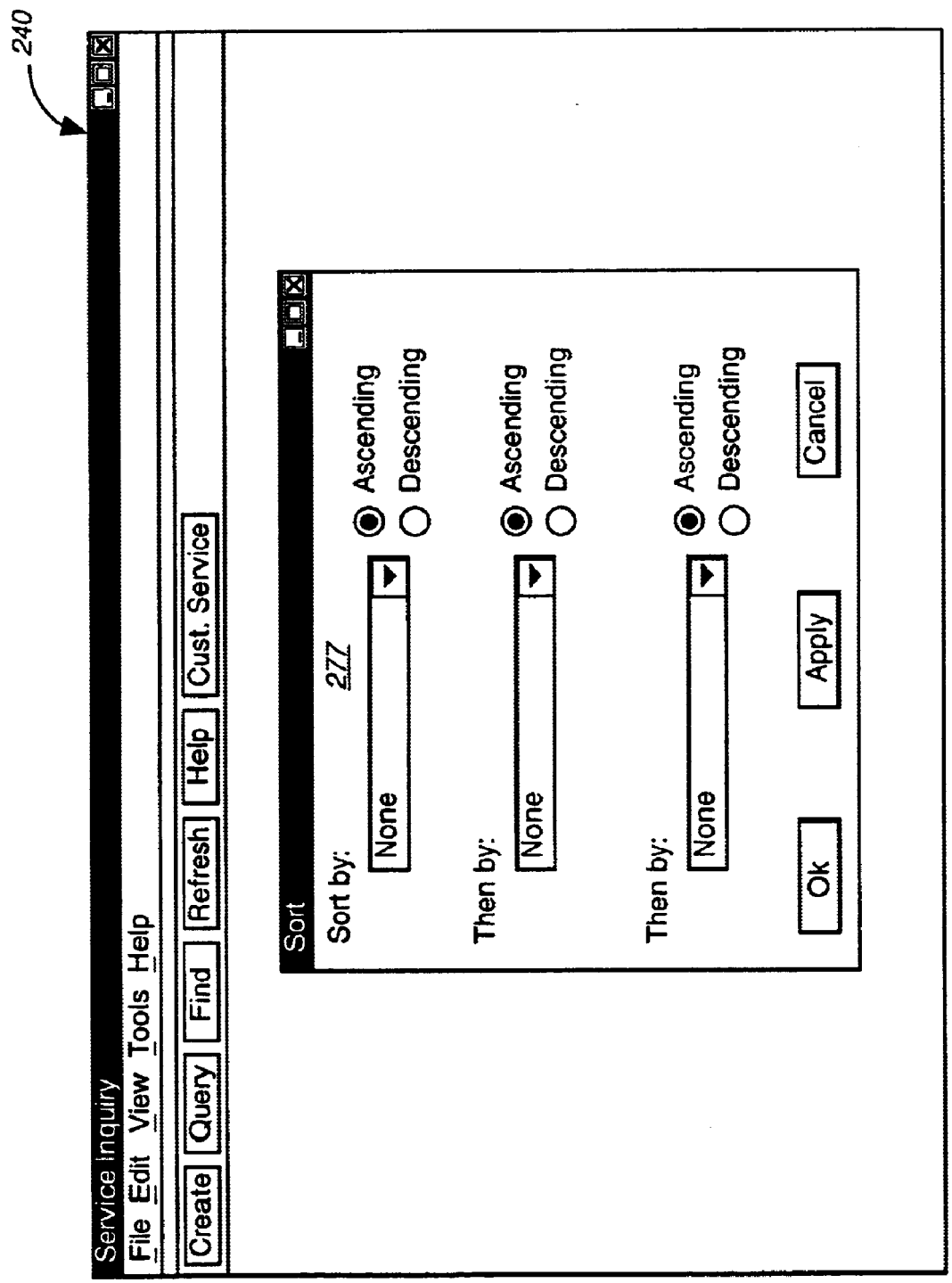
Figure 8E:
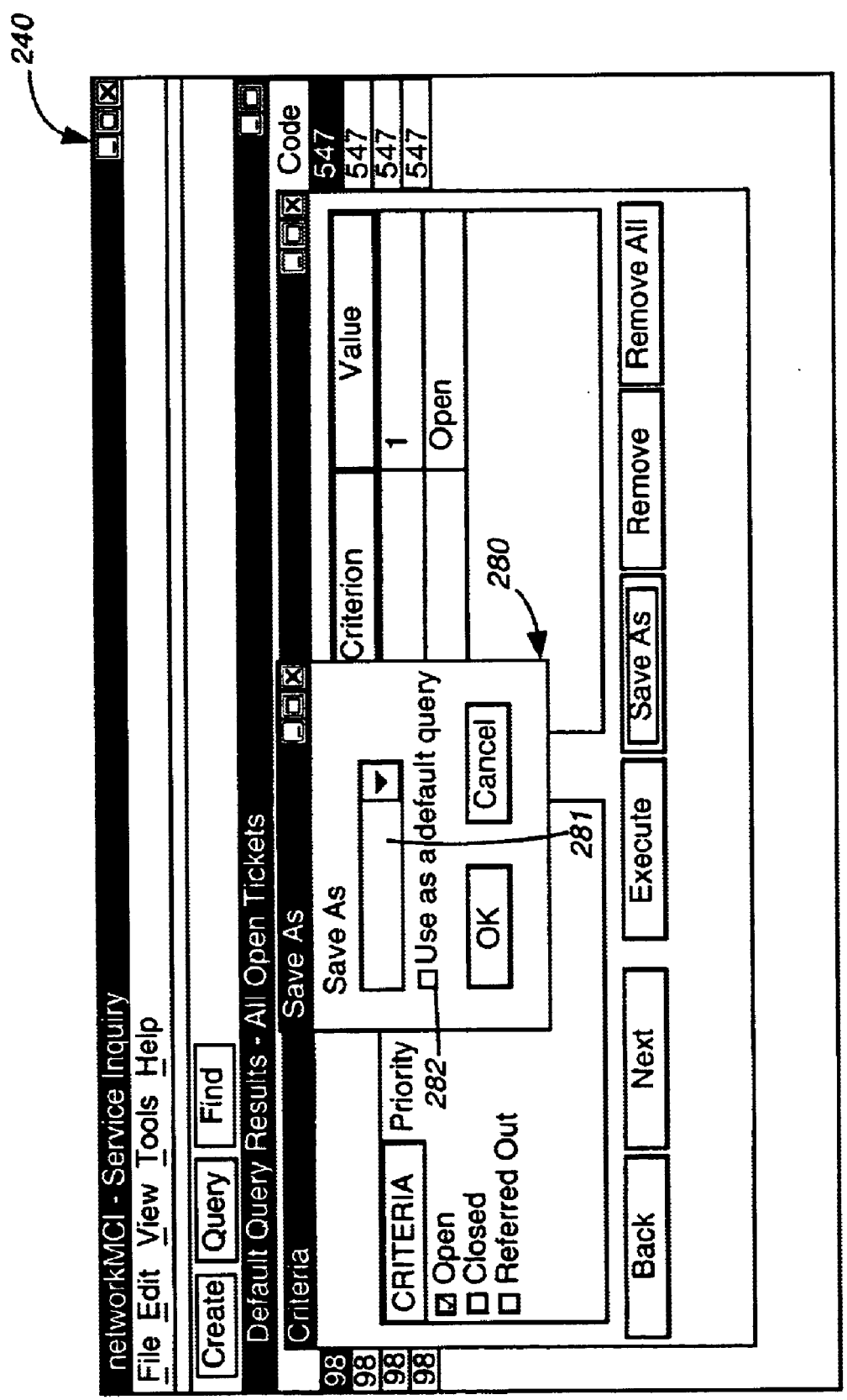

Once the query is specified and executed, the "Query Results" window such as provided in the example window 275 of FIG. 8(c) is displayed to present the results of the query in a table 278. Preferably, these results may be sorted by column by either clicking on the column in the table to sort by or by selecting "Tools/Sort" from the menu bar 241. Selecting "Tools/Sort" from the menu bar will initiate display of a "Sort" window such as the example display 277 shown in FIG. 8(d) which is capable of a three level sort by column in the table. The table columns can also be reordered by dragging and dropping them to their desired locations. Details of a particular ticket may also be viewed.

Figure 8F:
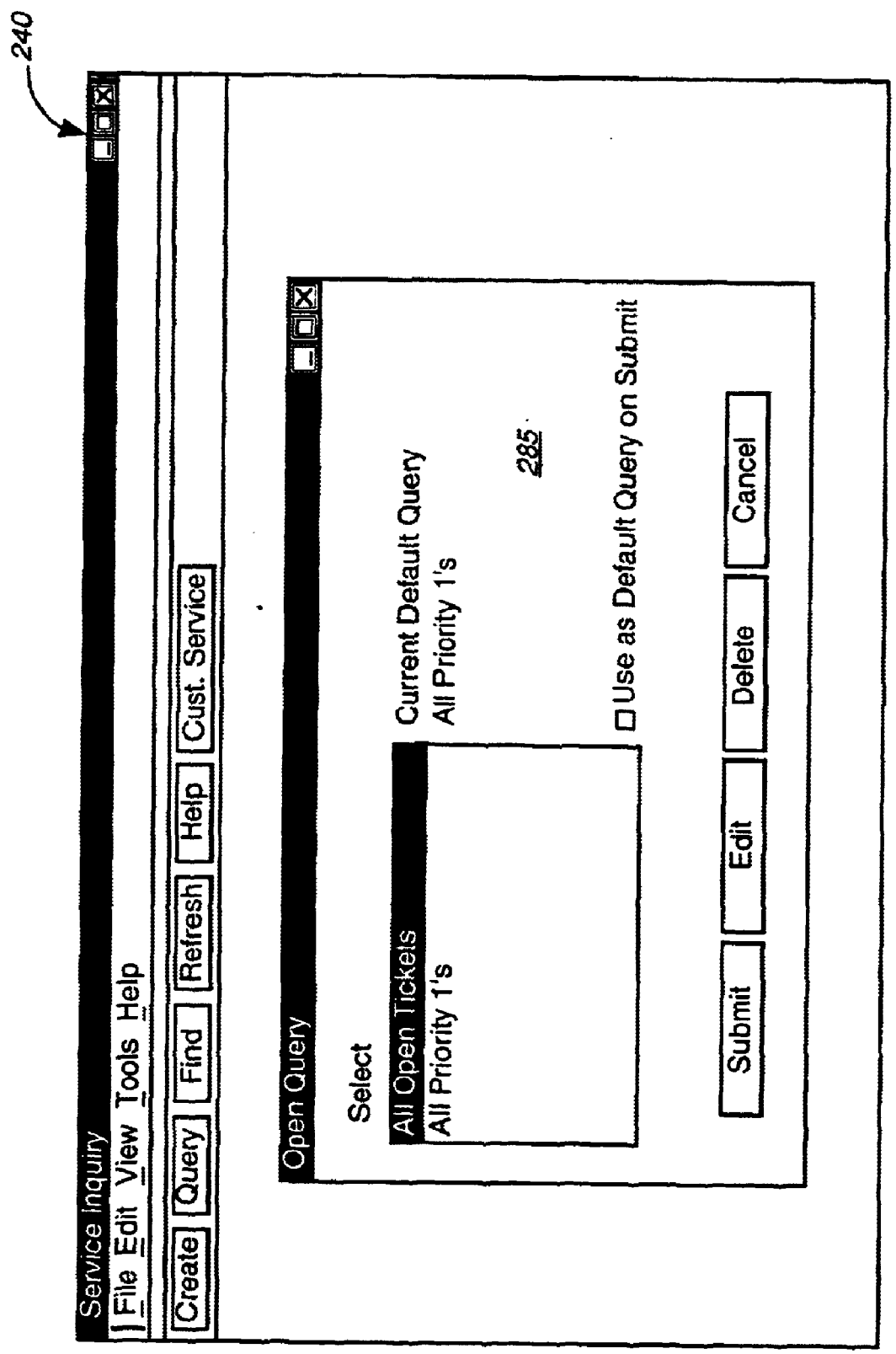

The ability to save and retrieve queries allows a customer to persist queries not only for the current session but for future sessions as well. This gives the customer the ability to define a query once, then save it such that there will be no need to define it again, i.e., all the user needs do is retrieve and execute it. To save a query, the user must first create the query and then select the "Save As" button which enables display of the "Save As" window such as the example window 280 shown in FIG. 8(e). This window enables a customer to select from the list of existing saved queries or type a new name in entry field 281. If an existing saved query is selected its query will be copied over and its name will refer to this new query. A checkbox 282 is available to designate this new query as the Default Query. To retrieve a saved query, e.g., upon selection of the "File/Open/Query" from the menu bar 241, an "Open Query" window such as the example window 285 shown in FIG. 8(f) is displayed which provides a list of all saved queries. Once the desired query is selected the user may perform the following: execute the query, i.e., run the query and display the results in the "Query Results" window or a "Default Query" window if the user selects it as their default query; or, edit the query by bringing up the "Criteria" window 270 (FIG. 8(b)) with the appropriate parameters already in the table.

Figure 8G:
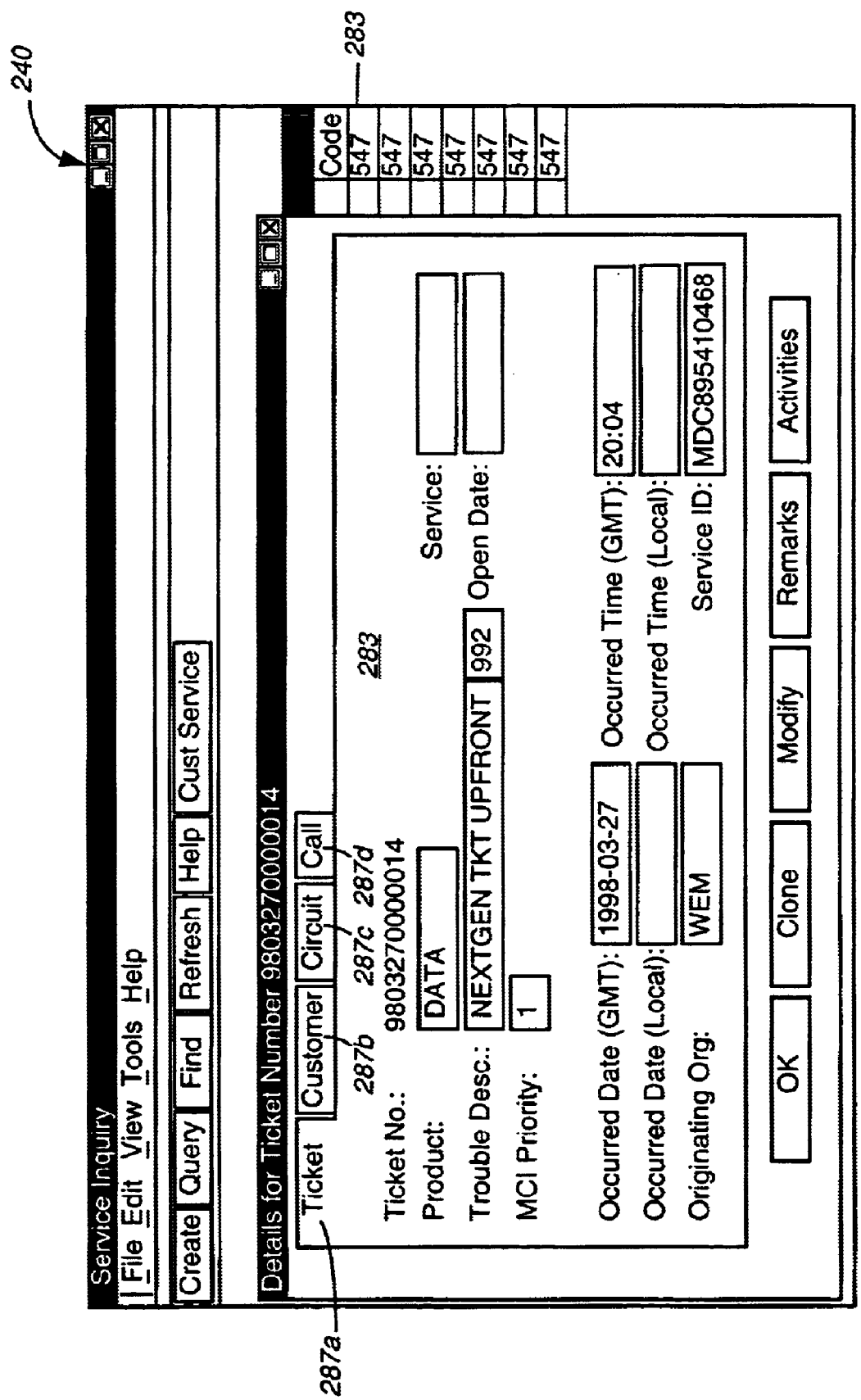
Figure 8H:
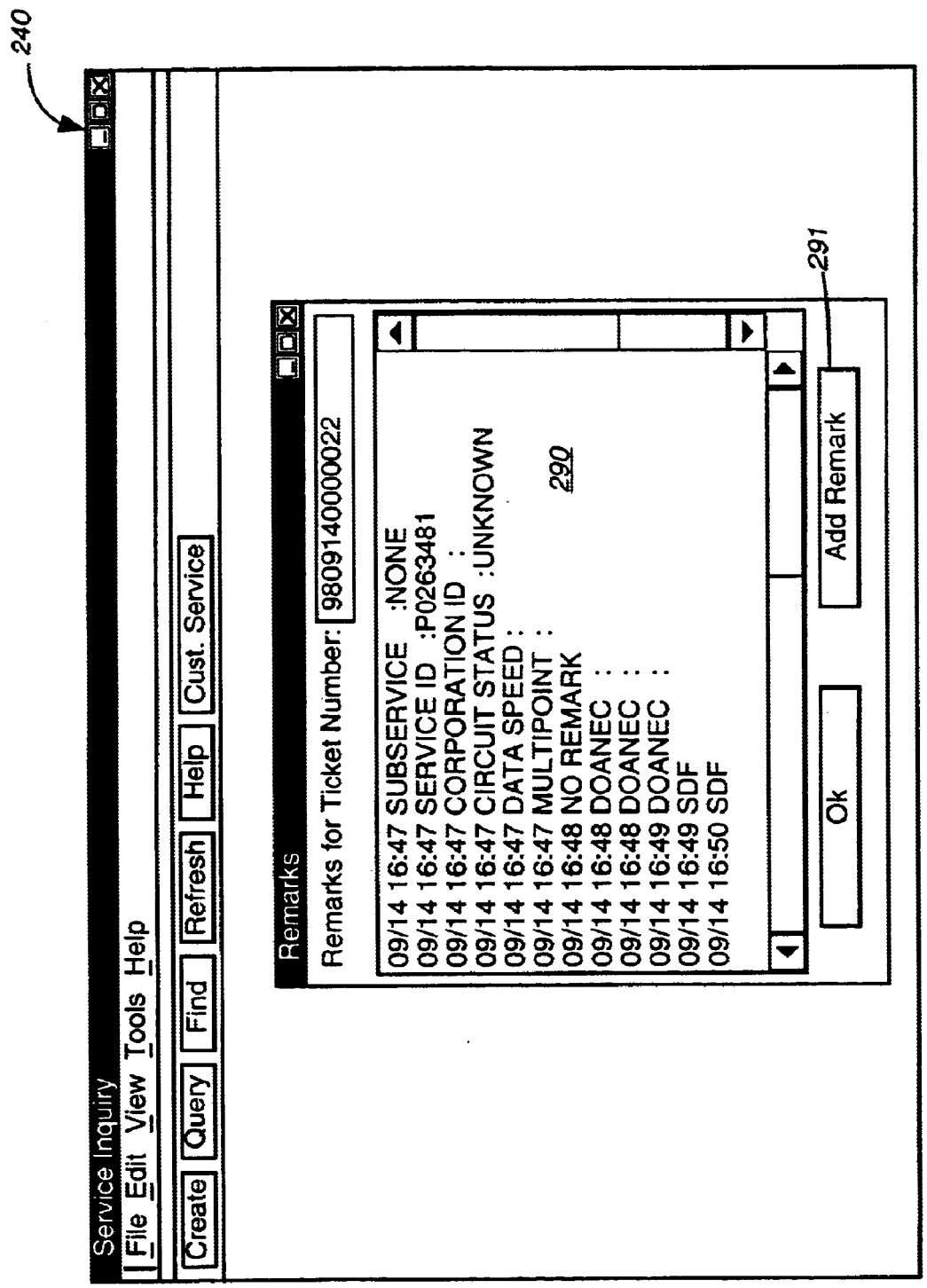
Figure 8I:
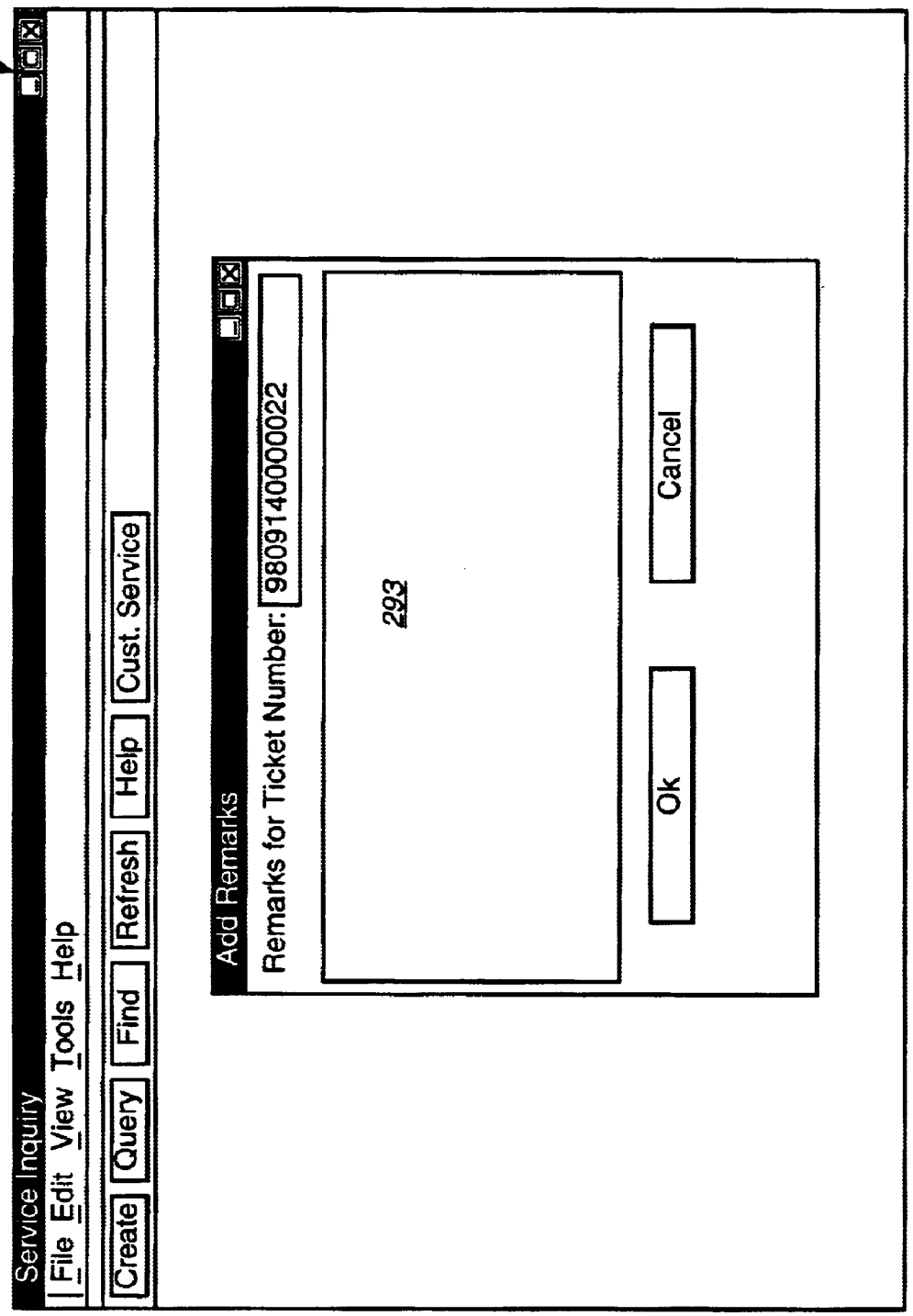
Figure 8J:
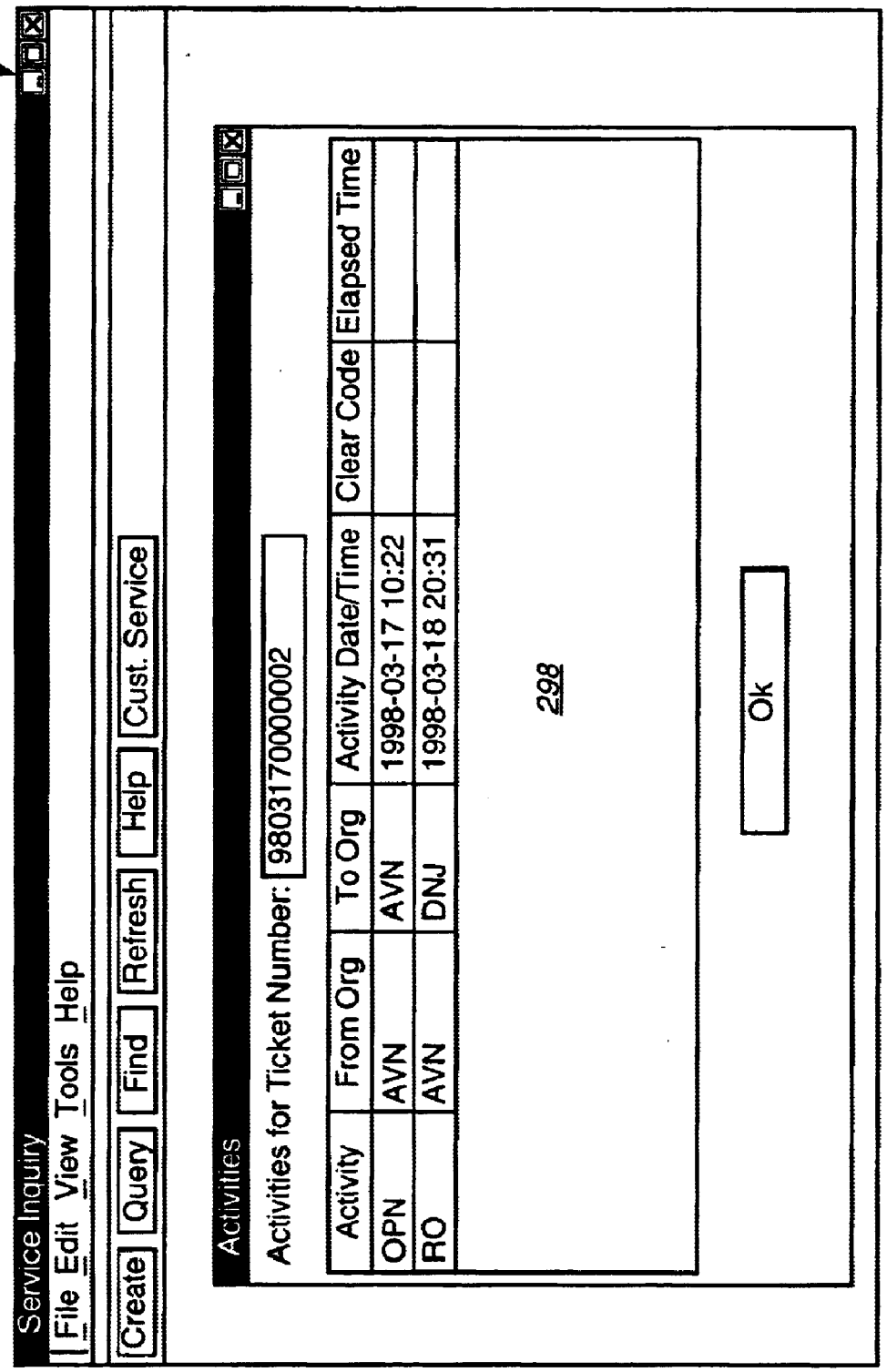
Figure 8K:
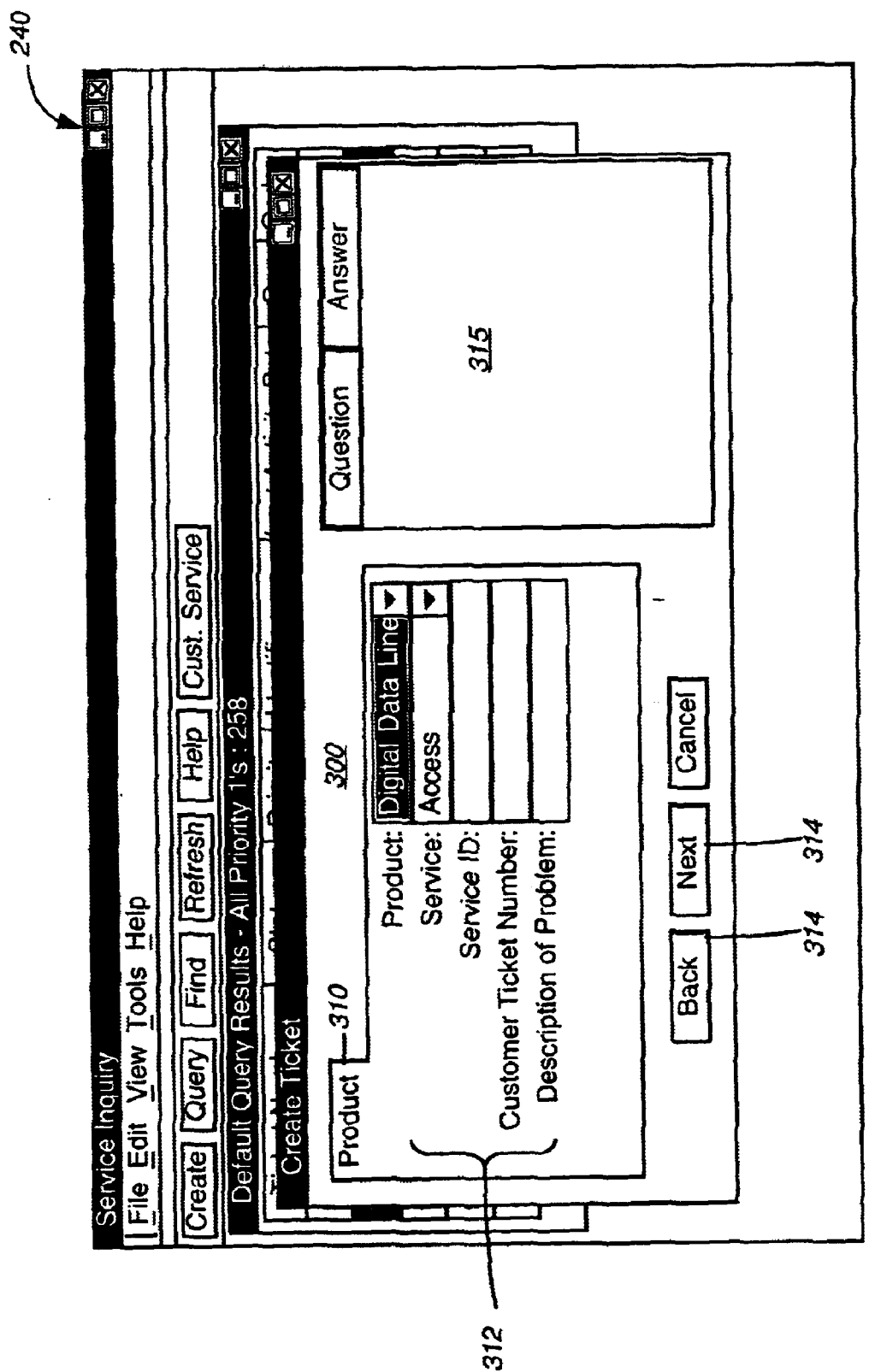

The customer may then view the results of a query, i.e., the details, remarks or activities of a Ticket chosen from a list of Tickets. To view the details of a ticket, the user may either select it from the query results and select "View/Details" from the menu bar or double click the ticket in the query results. Particularly, a "Display Ticket Request Transaction" (CSM/SI transaction) may be used to obtain the details, activities and remarks of a ticket. This transaction allows several display requests to be made, e.g., by setting corresponding flags to 'Y'. Whenever the customer wishes to view details, remarks or activities of a particular ticket, this request will be made with all the three flags set and the ticket number stuck into the SI header which will generate three or more responses. The "Display Detail Response Transaction" is a response that returns all the data elements corresponding to a given ticket in a "Details" window such as the example window 283 shown in the FIG. 8(g). This window 283 includes selectable tabs 287a, . . . ,287d comprising information about the selected ticket. For example, selection of the ticket tab 287a, as shown in FIG. 8(g), provides ticket information including: ticket number, ticket product, ticket service, date occurred, trouble description, and organization (ORG) code, etc. The customer tab 287b, circuit tab 287c, and call tab 287d will provide additional detailed information including: ticket priority, ticket status, ticket identifier, etc. It should be understood that the number of data elements will be different for different types of tickets.

Appendix B provides the general format of a "Display Detail Request" Transaction and corresponding "Display Detail Response" Transaction.

Alternately, to find a ticket, e.g., upon selection of the "Find" button 248 from the tool bar 245, the CSM/SI Transaction, "Display Ticket Request" Transaction is invoked, where the ticket number is passed on the request for handling as described above. It should be understood that, in the preferred embodiment, a "Change Ticket Request Transaction" may be implemented allowing the customer to change some of the fields of a ticket that is already created. This restriction is enforced by the GUI as this CSM/SI transaction does not impose any such conditions on the field being modified.

Appendix C provides the general format of a "Change Ticket Request" Transaction and corresponding "Change Ticket Response" Transaction.

Remarks

Remarks are comments added to a ticket for historical purposes and can aid in the resolution of the problem. A customer must be viewing the particular ticket's details that contain the remarks desired. The "Display Remarks Response Transaction" is a response that shows all the comments added on the ticket either by the customer or by the trouble ticket processing organization. The CSM legacy system supports "public" and "private" remark types. Thus, from the "Details" window 283 shown in FIG. 8(g), the user may click on the "Remarks" button 289 which will bring up the "Remarks" window such as the example window 290 shown in FIG. 8(h). From the remarks window, all public remarks for that ticket are displayed.

Appendix D provides the general format of a "Display Remarks Response" Transaction in which CSM provides all of the remarks on the requested ticket along with the fields on each remark.

It should be understood that remarks may be added to a ticket for historical purposes, e.g., to aid in the resolution of the problem. Thus, from the "Remarks" window 290 the customer may click on the "Add Remarks" button 291 which enables display of the "Add Remarks" window 8(i) which allows the customer to add remarks to that Ticket in Remarks entry window 293. Thus, by clicking the "OK" button in FIG. 8(i), an "Add Remarks Request" Transaction is sent to the CSM via Registry, to add remarks on the indicated ticket that is in an open status at any time. This may be used as a final step, just after creating a ticket, for example, to enable the customer to describe the trouble in his/her own words or add any comments. The CSM returns a success or failure response in a "Add Remarks Response" Transaction.

Appendix E provides the general format of a "Add Remarks Request" Transaction and corresponding "Add Remarks Response" Transaction.

Activities

Activities are events that occur to a ticket throughout its lifecycle. These events include changing status, changing priority, and reassignment of the person working the ticket. The customer must be viewing the particular ticket's details that contain the activities desired. The "Display Activity Response Transaction" is a response that provides all the activities, i.e., actions that have been taken on the ticket. Specifically, from the "Details" window 283 (FIG. 8(g)), the customer may click on the "Activities" button 288 which will bring up the "Activities" window 298 such as shown in the example screen display of FIG. 8(j). From the activities window, the activities for that ticket are displayed. This is a useful transaction in checking the status of a ticket and, it aids in tracking a ticket as it shows which organization the ticket is currently in.

Appendix F provides the general format of a "Display Activities Response" Transaction in which CSM provides all of the activities on the requested ticket along with the fields of each activity.

The create component of Service Inquiry application provides Service Inquiry customers with the ability to create a ticket within the system. The first step in the creation of a trouble ticket is to identify the Event-Type/Call-Type of the problem which is basically the way CSM handles different problem types and is required for most CSM/SI transactions. To do that the client front end asks the customer the problem/identifier type and then narrow down the problem by having the customer choose from a list of Product types, Service types and Trouble Descriptions as described herein with respect to FIG. 8(k). Based on these choices the system maps it to the correct Event-Type/Call-Type which mapping is done using QuestionTree objects stored on the SI application server locally on the client. Once the Event-Type/Call-Type is determined, the data fields that correspond to that Event-Type/Call-Type is obtained from the Question-Tree objects. The information required for all these fields is then gathered from the customer by presenting appropriate questions. Once all the required information is available, the system performs an "Open Ticket Request Transaction" and passes all of the data fields. Upon receipt of the "Open Ticket Request" Transaction, the CSM legacy system then attempts to open a Trouble Ticket based on the data passed, and performs an "Open Ticket Response Transaction" to indicate if the ticket was created successfully along with the ticket number. Based on this response a confirmation message along with the ticket number is displayed to the customer.

Appendix G provides the general format of a "Open Ticket Request" Transaction which is used to open a Trouble Ticket by passing data elements required to create a ticket, and the corresponding "Open Ticket Response" Transaction which returns an indication whether a ticket was successfully created or not and provides a ticket number of the ticket.

As an example, to create a service request from scratch, the customer may select, for example, the "Create" button 246 from the tool bar 245 of FIG. 8(a). This will initiate display of a "Create" window such as the example window 300 shown in FIG. 8(k). From this window, the customer provides answers to the questions for each tab 310. Particularly, questions are populated for each tab 310 in a table 315, for which answers are to be provided in table 315. When the question(s) are answered, the user may then click the "Next" button 314 to go to the next set of questions. As the next tab appears, the answers from the previous tab populate the table 312 to the left. The user may navigate via the "Back" and "Next" buttons 314 or by using the tabs.

It should be understood that the questions presented to a customer are dynamic depending on previous answers. Thus, if the user goes back and changes the answer to a question that later questions depend on, then those questions will be overwritten by the new set of questions. The user will be warned if this is the case.

Too create a new Service Request by cloning an existing Serivce Request, the user needs to be viewing the details of the Service Request that they desire to clone. From this "Details" window, there is a button to "Clone . . . ". This will bring up the "Create" window with the default information from the old Service Request prepopulated. The user answers the questions for each tab and clicks the "Next" button when ready to go to the next set of questions. As the next tab appears the answers from the previous tab will populate the table to the left. The user may navigate via the "Back" and "Next" buttons or by using the tabs. The questions are dynamic depending on previous answers, so if the user goes back and changes the answer to a question that later questions depend on, then those questions will be overwritten by the new set of questions.

Once the ticket is opened, it is automatically referred out to a "Customer Facing Organization" to initiate the problem resolution process. To do this, the CSM system refers the ticket out to an organization obtained from the user up front and stored in the User Profile. This is done using an "Enter Activity Request Transaction" which allows the customer to enter different activities, e.g., 'Refer Out', 'Close', 'Refer Back' and 'Open' on a ticket by passing the appropriate activity code.

Appendix H provides the general format of an "Enter Activity Request" Transaction that passes fields used to add an activity on an existing ticket, and, the corresponding "Enter Activity Response" Transaction which is the response received from CSM returning an indication of success or failure of the request.

Finally, the SI application allows the customer to close the ticket also by using an "Enter Activity Request" Transaction. When a customer wishes to close a ticket, the system will make this transaction on behalf of the customer by passing the activity code for 'Close'. A customer is allowed to close a ticket only if it were created by that organization and if the ticket is currently in that organization, i.e., it has been referred out to that organization. Since only the organization that opened the ticket has authority to close it, once a ticket has been resolved the ticket is referred out to the customer's organization. If the customer is not satisfied with the problem resolution, that customer may refer the ticket back to the ticket resolution enterprise organization. This is also accomplished using the Enter Activity Request Transaction. Again, the system will make this transaction and pass the activity code for 'Refer Back'.

The creation of trouble tickets through Service Inquiry will now be described in greater detail in view of FIG. 9. In the preferred embodiment, the Service Inquiry application implements a domain object model (DOM) 318 that allows the collection of information regarding a problem with a product offered by MCI. The questions that need to be asked to open a ticket vary by product and problem type. In addition to specifying a problem with a particular product, Service Inquiry provides the user with the functionality to perform queries for Trouble Tickets and to view the details of Trouble Tickets. The DOM's responsibility is the creation and query of Trouble tickets and it accomplishes its tasks via interaction with the client presentation layer and interaction with the back-end systems. Information that is gathered via the presentation layer is used to construct backend transactions. The information returned from these backend transactions is formatted to DOM classes, which are forwarded to the presentation layer.

Figure 9:
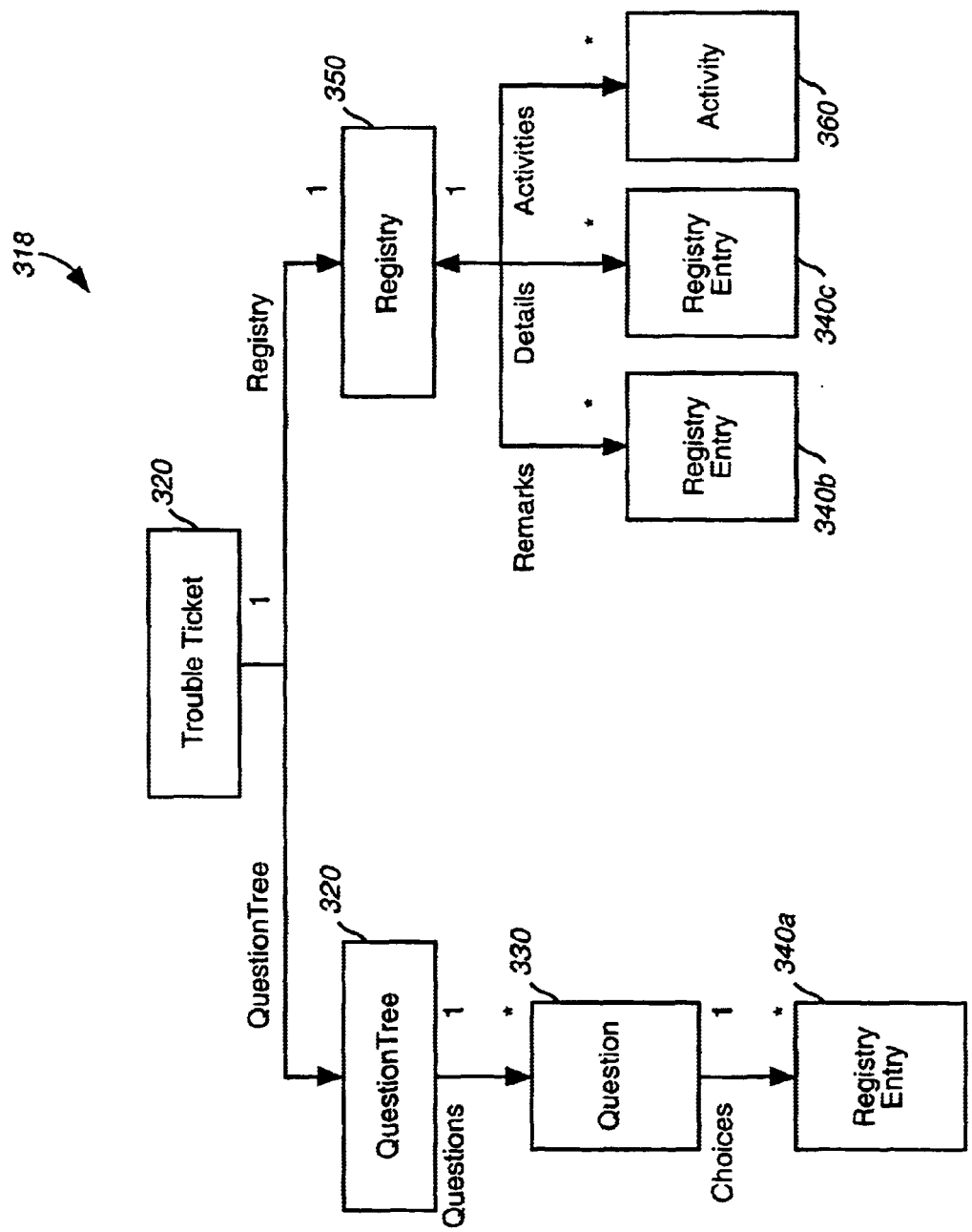
FIG. 9 illustrates a high-level collaboration diagram depicting object classes implemented during creation of a trouble ticket.

As shown in FIG. 9, the TroubleTicket class 320 is the root of the Service Inquiry DOM. TroubleTicket instances contain identifying information that is used by the presentation layer to sort and filter a collection of TroubleTickets. The TroubleTicket class is responsible for accepting requests from the presentation layer, forwarding the requests to the backend and returning results to the presentation layer. In addition to maintaining identifying information, a Trouble Ticket also contains references to a QuestionTree 320 and a Registry 350.

Specifically, a QuestionTree 320 is comprised of three Domain Classes: QuestionTree 320, Question 330 and RegistryEntry 340a. QuestionTrees 320 are essentially a set of questions for a particular product and problem type. The QuestionTree class is responsible for the grouping of questions and the navigation between the groups. In addition, a QuestionTree knows if it has been completely specified, i.e., all of its required Questions have been answered. Within a QuestionTree, the group or category is designated by a unique name (String). Preferably, questions are stored in a hashtable (not shown). A group name is the key and a vector of Questions is the value for each entry in the hashtable. The order of the groups is significant and since hashtables do not maintain order, a vector of Group names is required. This Vector of names is used for some of the navigational behaviors of a QuestionTree.

The Registry 350 is responsible for maintaining collections of objects that represent information retrieved from CSM via the client interface. The collections of objects represent Remarks, Details and Activities in CSM. Remarks and Details are also represented by vectors of instances of a "RegistryEntry" class. Activities are represented by a vector of instances of the Activity class 360 which is an information holder having instance variables containing information that corresponds to fields in the CSM/SI Activity Record.

The RegistryEntry class is a class in the ServiceInquiry DOM comprising instances 340a that are used by Question instances 330 and instances 340b,c used by Registry instances 350. When used by a Question, RegistryEntry instances 340a represent the possible choices for answers to the Question. Once the user selects a RegistryEntry "choice", this RegistryEntry instance becomes the answer to the question. When used by a Registry, the RegistryEntry instances 340b,c represent remark or detail information respectively, that is retrieved from CSM/SI. Specifically, RegistryEntry 340a,b,c comprise the following instance variables: 1) a Text instance variable which is an optional variable used to specify text that will be presented to the user as a choice for an answer to a Question if the value is different than that specified by the registryValue; 2) registryKey instance variable which maps to a key in CSM/SI; 3) a registryValue instance variable which maps to the value in CSM/SI specified by the key in registryKey; 4) a nextGroupID instance variable which is an optional field used by the Question to assist the QuestionTree in some navigational tasks; and, 5) a question instance variable which is a reference to the Question instance to which this RegistryEntry belongs. A RegistryEntry is contained by its Question; this instance variable is a back-pointer.

The Registry Classes, i.e., classes that represent CSM/SI Registry records, have two additional responsibilities that are variations of a single behavior. The Registry Classes (RegistryEntry and Activity) are used for communication between Service Inquiry and CSM/SI. CSM/SI requires Remark, Detail and Activity information in fixed-length field record format; Service Inquiry requires Remark, Detail and Activity information in Java object format (instances of RegistryEntry or Activity). To provide these two formats, the Registry Classes contain behavior to convert instances to fixed-length field record format and to instantiate themselves from fixed-length field record format.

Questions are the main component in a QuestionTree. A Question has a vector of group identifiers that indicate the groups to which it belongs. A Question additionally has a vector of RegistryEntry instances 340a called choices. When the user "answers" the Question, the answer is set to the selected choice; i.e., the selected RegistryEntry. Short answer or text answer questions are a specialization of this behavior. Within each group of Questions, there is one question that is designated as the decision point which is used to determine the next group of Questions that need to be presented to the user. As a Registry Entry may contain a nextGroupID, the nextGroupID of the RegistryEntry instance selected as an answer to a decision point Question is used to derive the next group of Questions. Occasionally, the only difference between two groups of Questions is the inclusion or exclusion of a particular Question. One solution is to create two identical groups, one with the optional question and one without and rely on the decision point mechanism. In the preferred embodiment, a parent-child relationship between Questions is created. The inclusion/exclusion of a Question (child) in a group is based on the answer to a previous Question (parent). A child Question maintains a reference to one of the possible choices (RegistryEntry) of the parent Question. If the parent Question's answer is the same as the child Question's parentAnswer, the child Question is included in the group; otherwise, it is excluded from the group.

From three relatively simple classes (QuestionTree, Question, RegistryEntry) shown in FIG. 9, it is possible to construct fairly complex QuestionTree structures. It is the context and relationships of the instances of the three classes that provide the expressiveness of the Domain Object Model 318. It should be understood that there are two phases or contexts for a QuestionTree: 1) construction, i.e., the creation and maintenance of a QuestionTree; and, 2) usage, i.e., the use of a QuestionTree in the process of opening a TroubleTicket.

Figure 10:
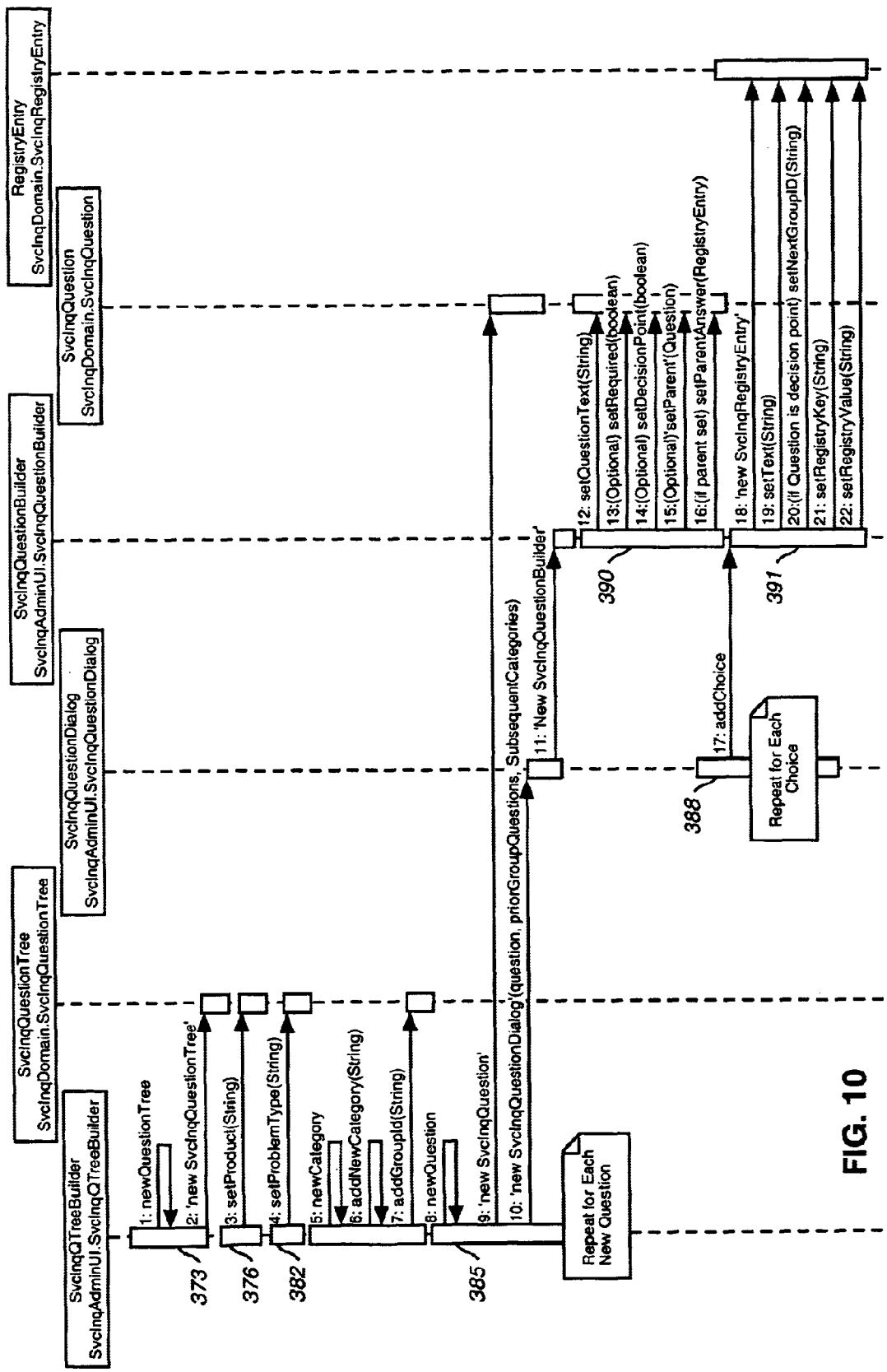
FIG. 10 illustrates a sequence diagram depicting the creation of a QuestionTree object which is subsequently used for presentation to a user.
Figure 11A:
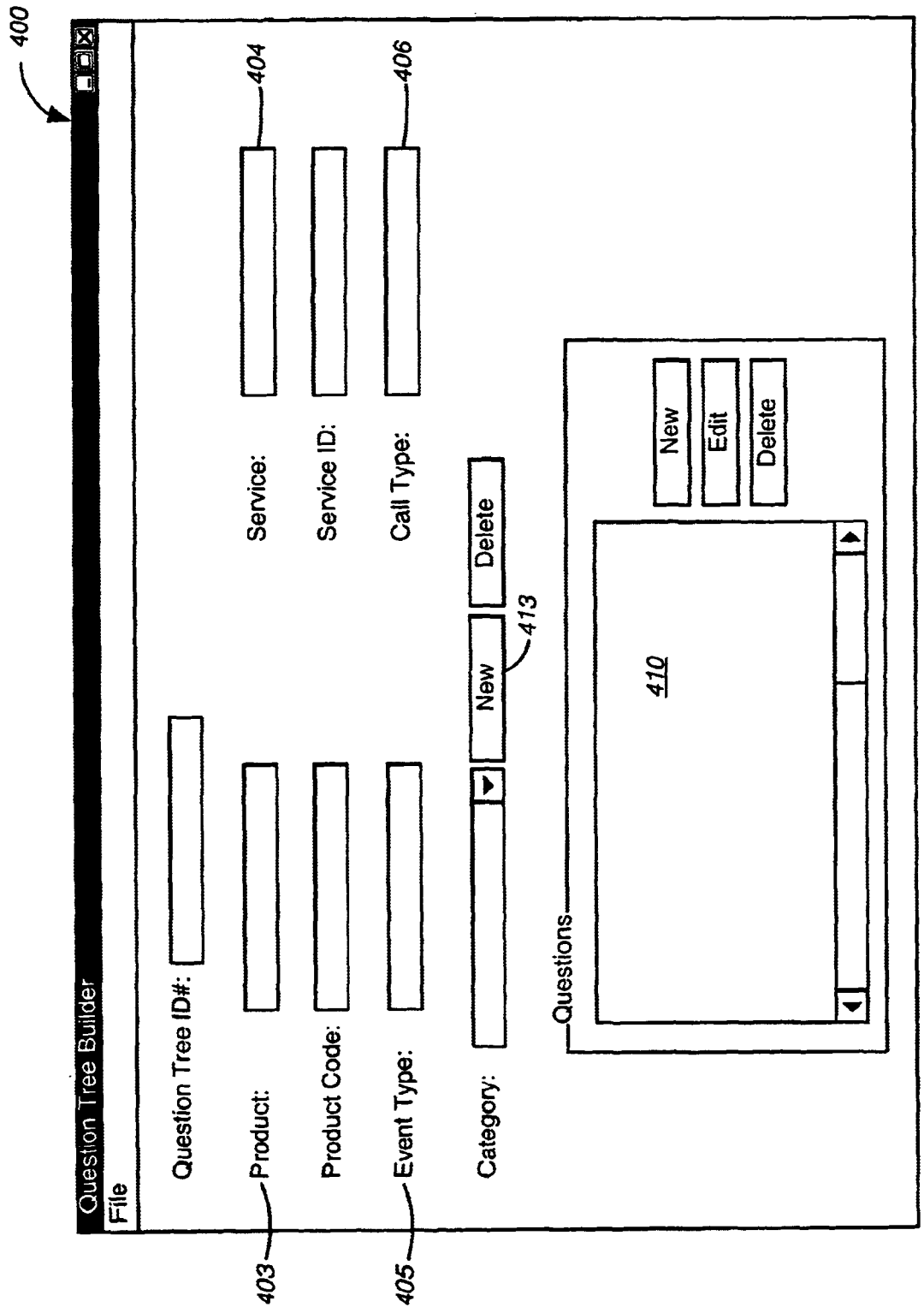
FIGS. 11(*a*)–11(*d*) illustrate various interfaces enabling an administrator to generate a QuestionTree for presentation to a user in accordance with a product and service type.
Figure 11B:
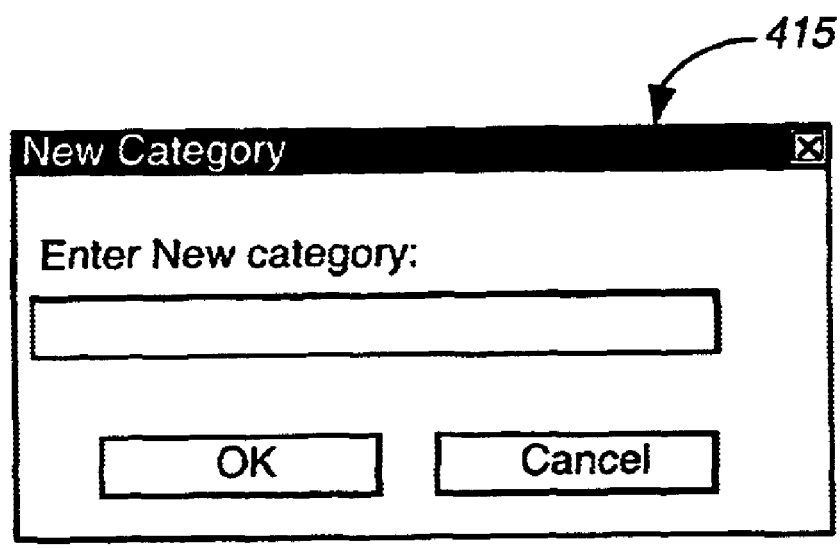
Figure 11C:
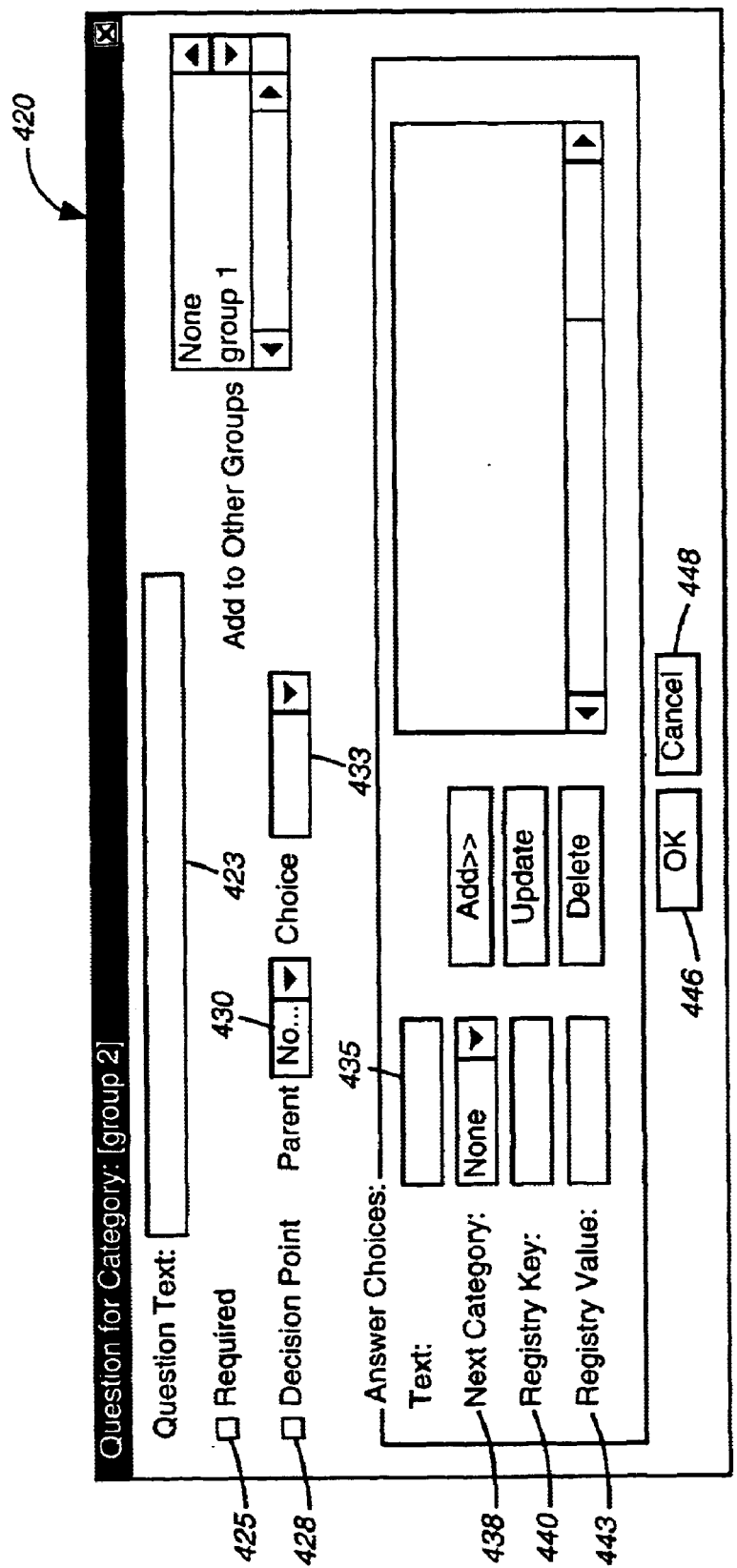
Figure 11D:
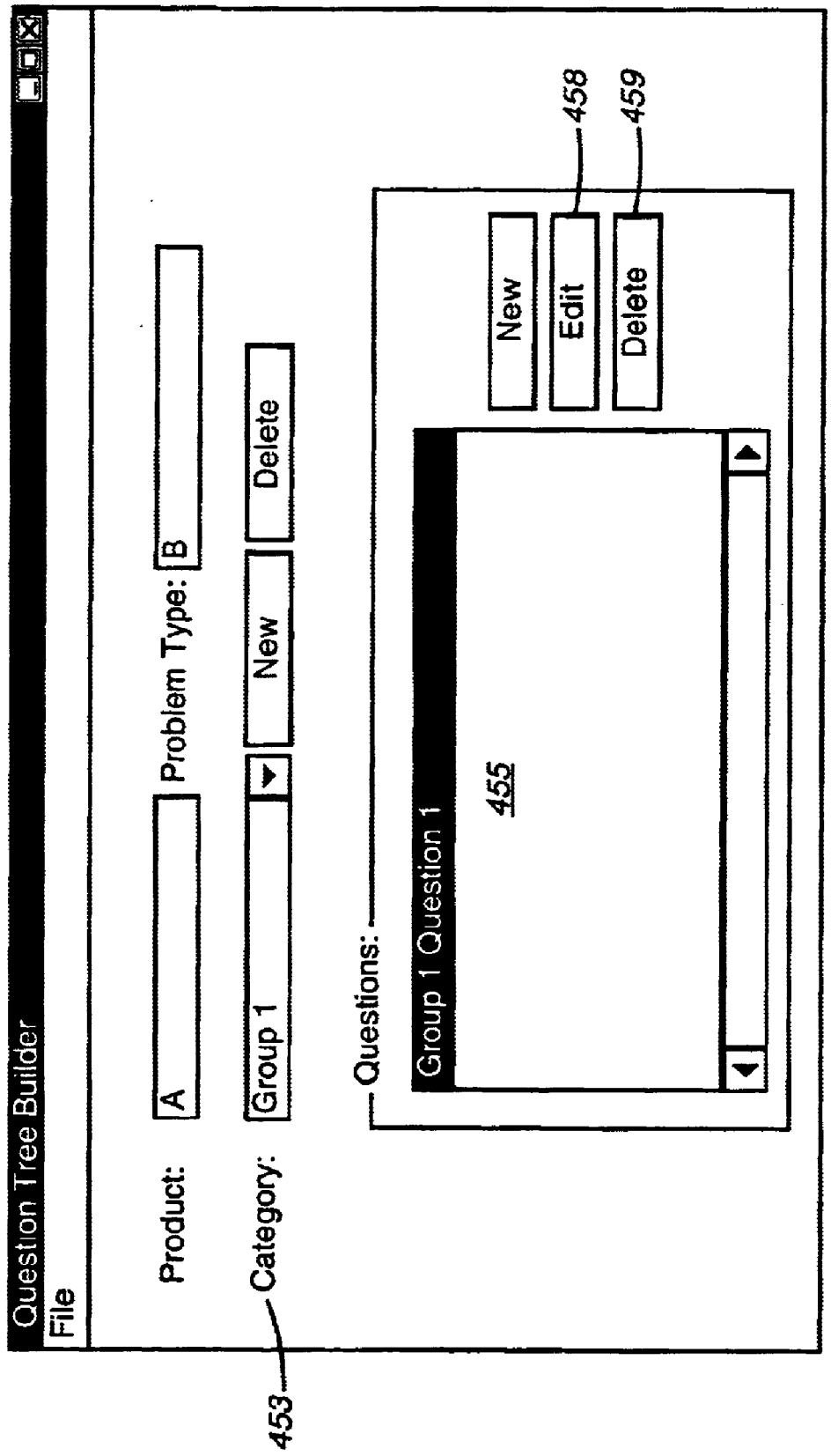

With more particularity, the construction of a QuestionTree is accomplished via a Java Application called the QuestionTreeBuilder. The sequence diagram shown in FIG. 10 illustrates the construction of a QuestionTree with additional reference being had to Appendix I which provides a QuestionTree class diagram. Preferably, a QuestionTree is constructed in a hierarchical process as follows: A first event 373 invokes objects for creation of a new QuestionTree. Then, in event 376, a product is specified and, at step 379, a service type is identified. An event 382 a group identifier is specified, and at event 385, a Question is created pertaining to the particular product, problem type and groupID. If other questions are created, events at 385 are repeated. As shown at sequence events 390, the builder may optionally set a question as a decision point, or set specify a question as a "parent". At event 388, a choice, i.e., possible answer, is created for that the question. Additionally a RegistryEntry is created as indicated as events 391. If other choices are presented, the events at 388 and 391 are repeated for the questions(s). If another group of questions is specified. If a question is set as a decision point, another group may be created in events 391. Once the QuestionTree is completely specified, it is saved to the persistent store. During construction and maintenance, all elements of a QuestionTree are visible, i.e. there is no filtering by execution of the rules.

Thus, when a customer initiates the creation of a Trouble Ticket, the customer specifies the product and service type, which is used to retrieve the QuestionTree from the persistent store. The QuestionTree is opened in READONLY mode. The first group of Questions is presented to the user. Subsequent groups and Questions are presented to the user, based on prior answers. In this context, the entire QuestionTree is not visible to the user, unless there are no alternate paths based on prior answers. Once all required Questions have been answered for a QuestionTree, it is in the state to populate TroubleTicket detail information. The information required to create a valid Trouble Ticket may vary by product/service type. The remaining classes in the DOM, in addition to the QuestionTree and its components, used in Trouble Ticket creation and query are described herein.

During creation, the TroubleTicket is responsible for retrieving the appropriate QuestionTree. The TroubleTicket collaborates with the QuestionTree to provide the question groups to the presentation layer. Once the QuestionTree is fully specified, i.e., has all required Questions answered, the trouble ticket uses the answers (RegistryEntry instances) to construct components used in the backend transaction to create a TroubleTicket in the CSM legacy system 40(*a*).

Particularly, to facilitate communication with the backend, i.e., Registry/SI/CSM (FIG. 7) there are two additional classes: RegistryHeader and SIHeader, the format of each which is provided in Appendix J. Instances of these classes allow the ServiceInquiry application 200 to provide the necessary header information through standard Java methods. Like the Registry Classes, these classes can also represent their information in the string format (fixed-length field records) required by the backend. The Translator utility class 280 (FIG. 7) facilitates the use of the formatting behaviors of the Registry Classes and Header classes. As shown in FIG. 7, the Translator resides on the SI application server transaction server 250, and, as described, has two responsibilities: 1) to create correctly formatted CSM/SI transactions from ServiceInquiry objects and 2) to create ServiceInquiry objects from the results of CSM/SI transactions. The Translator coordinates the activities and collaborates with the Registry Classes and Header classes.

To invoke the creation of a QuestionTree, ServiceInquiry provides a QuestionTree tool which enables a QuestionTree "Administrator" to create a set of questions specific to a Product/Problem type combination. The customer will then answer these questions during the creation of Trouble Tickets. A QuestionTree is essentially a set of questions, which are grouped in an order chosen by the administrator. The grouping of questions also determines the order that questions are displayed to the customer via the client browser GUI.

To illustrate the QuestionTree creation process reference is had to FIG. 11(*a*) which depicts an example screen display 400 used by the Administrator when creating a QuestionTree. From the screen 400, the administrator of the QuestionTree may select the Product, as indicated by entry field 403, service, as indicated by entry field 404, event type, as indicated by entry field 405, and call type, as indicated by entry field 406. Once these have been entered the user creates different groups, or categories of questions for the Product/Problem type. Once the groups have been named, the Administrator populate a group with individual questions in a Question entry area 410. To name a category of questions, a "New" category button 413 is selected to initiate the display of a dialog screen 415 shown in FIG. 11(*b*) enabling entry of the new category. Once the categories for a QuestionTree have been named, the administrator may complete the information needed for individual question(s). The administrator selects the category to add questions from the Category drop down box, and then selects the New button 413 in the Question area of the main screen window of FIG. 11(*a*) which initiates display of a dialog 420, as shown in FIG. 11(*c*) for formatting a question.

As shown in FIG. 11(*c*), the following fields in the question dialog include: a Question Text field 423 which enables entry of the text that the customer will see during the Ticket Creation process; a Required check box 425 to indicate if the question must be answered; a Decision Point check box 428 to indicate if the question is used for deciding the next group of questions to be sent to the customer; a Parent drop down box 430 to identify which category/group of questions is the parent group for this question; a Choice drop down box 433 to identify which answer of the parent question is the answer that this question is linked to. As further shown in the Question dialog of FIG. 11(*c*), the following answer choice fields include: a Text field 435 displayed for a question with two or more answers; a Next Category drop down box 438 enabling Administrator selection of the group of questions to follow this group if the Question is a decision point; a Registry Key field 440 for providing the key value for a registry entry; Registry Value 443 for providing the value for the registry entry Key. The "OK" button 446 saves the instance of this question and returns to the QuestionTree Builder dialog screen 400 (FIG. 11(*a*)). The Cancel button 448 will ignore any entries that have been made and return to the QuestionTree Builder dialog screen.

Once a question has been saved to the QuestionTree using the "OK" button it will be visible on the QuestionTree Builder screen 450 whenever that group is selected, as shown in FIG. 11(*d*). Particularly, once a question has been entered for a group, it can be edited by selecting its group from the Category drop down box 453. All the questions for that group appear in the Questions box window 455, and the Administrator may select any question from this list. The Edit button 458 will bring up the Question Builder dialog window where the question may be edited. The only prepopulated field is the question text field. A question may also be deleted from a group by using the Delete button 459.

The foregoing merely illustrates the principles of the present invention. Those skilled in the art will be able to devise various modifications, which although not explicitly described or shown herein, embody the principles of the invention and are thus within its spirit and scope.

APPENDIX A

List Ticket – Status Request

| Field | Description | Value | Field Type & Size | Required | Note |
|---|---|---|---|---|---|
| REGISTRY- HEADER | First part of the transaction that provides information about which Registry Domain, Service names are being used. | | Character 109 | Yes | Details on this field is in the Registry Header table |
| SI-HEADER | Second part of the transaction that provides application and transaction specific information relevant to CSM's Standard Interface. | | Character 105 | Yes | Details on this field is in the SI Header table. Only the fields relevant to this transaction are described below |
| ORG-ID | Organization Code of the customer's organization | A assigned to the customer | Character 3 | Yes | Field is in the SI header |
| EB FIXED DATA | Not relevant to the Service Inquiry application | | Character 30 | Yes | Needs to be filled with blanks |
| INSTANCES | Gives the number of fields on the request | 00002 | Numeric 5 | Yes | The data area that follows is an array of name-value pairs that are repeated for each field |
| ELEMENT- NAME1 (SI-START DATE) | Indicates to CSM/SI to use the corresponding value for the this field | "SI START DATE" | Character 13 | Yes | The actual start date is in the next field |
| ELEMENT-VALUE1 (actual start date) | This start date is used by CSM as a starting point for the tickets search | Customer selected start date | Character 30 | Yes | Format is YYYYMMDD |
| ELEMENT- NAME2 (SI-STATUS TYPE) | Indicates to CSM/SI to use the corresponding value for the this field | "SI STATUS TYPE" | Character 13 | Yes | The actual status code is in the next field |
| ELEMENT-VALUE2 (actual status type) | Status code to be used in the search | OPN-Open REF-Referred CLR-Closed CAN-Cancel | Character 30 | Yes | Only a single status code can be specified per request |

List Ticket – Status Response

| Field | Description | Type & Size | Note |
|---|---|---|---|
| REGISTRY- HEADER | First part of the transaction that provides information about which Registry Domain, Service names are being used. | Character 109 | Details on this field is in the Registry Header table |
| SI-HEADER | Second part of the transaction that provides application and transaction specific information relevant to CSM's Standard Interface. | Character 105 | Details on this field is in the SI Header table. |
| OUT-STATUS | Gives the status of the request | Numeric 2 | A status of 00 indicates that the request was completed successfully |
| OUT-INSTANCES | Number of tickets returned in the data portion of the response | Numeric 5 | The data area that follows is an array of field entries that are repeated for each ticket. |
| TICKET-NUMBER | The ticket number itself | Character 13 | One per ticket |
| ORG | Organization in which the ticket was created | Numeric 3 | One per ticket |
| STATUS | Current status of the ticket | Character 3 | One per ticket |
| DATE | Date of last ticket activity | Character 8 | One per ticket |

| TIME | Time of last ticket activity | Character 4 | One per ticket |
|---|---|---|---|
| PRIORITY | Priority of the ticket | Character 1 | One per ticket |
| CUST PRIORITY | Customer ch~ .n priority of the ticket | Character 2 | One per ticket |
| CIRCUIT NUMBER | Circuit number on the ticket if relevant | Character 12 | One per ticket |
| TROUBLE CODE | Trouble code on the ticket | Character 3 | One per ticket |

APPENDIX B

Display Detail Request

| Field | Description | Value | Field Type & Size | Required | Note |
|---|---|---|---|---|---|
| REGISTRY- HEADER | First part of the transaction that provides information about the Registry Domain, Service names are being used. | | Character 109 | Yes | Details on this field is in the Registry Header table |
| SI-HEADER | Second part of the transaction that provides application and transaction specific information relevant to CSM's Standard Interface. | | Character 105 | Yes | Details on this field is in the SI Header table. Only the fields relevant to this transaction are described below |
| TICKET NUMBER | The ticket number on which the details is being requested | As assigned by CSM | Character 13 | Yes | Field is in the SI header |
| EB FIXED DATA | Not relevant to the Service Inquiry application | | Character 30 | Yes | Needs to be filled with blanks |
| INSTANCES | Gives the number of flags set on the request | 00003 | Numeric 5 | Yes | The data area that follows is an array of name-value pairs that are repeated for each flag |
| ELEMENT- NAME1 (SI-DETAIL FLAG) | Indicates to CSM/SI to use the corresponding value for this flag | "SI DETAIL FLAG" | Character 13 | Yes | Whether the flag is set or not is denoted in the next field |
| ELEMENT-VALUE1 (actual flag) | This flag is used by CSM to determine whether to generate the corresponding response | Y | Character 30 | Yes | |
| ELEMENT- NAME2 (SI-ACTIV FLAG) | Indicates to CSM/SI to use the corresponding value for this flag | "SI ACTIVFLAG" | Character 13 | Yes | Whether the flag is set or not is denoted in the next field |
| ELEMENT-VALUE2 (actual flag) | This flag is used by CSM to determine whether to generate the corresponding response | Y | Character 30 | Yes | |
| ELEMENT- NAME3 (SI-REMARK FLAG) | Indicates to CSM/SI to use the corresponding value for this flag | "SI REMARK FLAG" | Character 13 | Yes | Whether the flag is set or not is denoted in the next field |
| ELEMENT-VALUE3 (actual flag) | This flag is used by CSM to determine whether to generate the corresponding response | Y | Character 30 | Yes | |

Display Detail Response

| Field | Description | Type & Size | Note |
|---|---|---|---|
| REGISTRY-HEADER | First part of the transaction that provides information about which Registry Domain, Service names are being used. | Character 109 | Details on this field is in the Registry Header table |
| SI-HEADER | Second part of the transaction that provides application and transaction specific information relevant to CSM's Standard Interface. | Character 105 | Details on this field is in the SI Header table. |
| OUT-STATUS | Gives the status of the request | Numeric 2 | A status of 00 indicates that the request was completed successfully |
| OUT-INSTANCES | Number of CSM data fields returned the data portion of the response | Numeric 5 | The data area that follows is an array of field entries that are repeated for each item. |
| ELEMENT-NAME | Name of the CSM data field of the requested ticket | Character 13 | One per data element/field |
| ELEMENT VALUE | Actual value of that data field for the requested ticket | Character 30 | One per data element/field |

APPENDIX C

Change Ticket Request

| Field | Description | Value | Field Type & Size | Required | Note |
|---|---|---|---|---|---|
| REGISTRY-HEADER | First part of the transaction that provides information about which Registry Domain, Service names are being used. | | Character 109 | Yes | Details on this field is in the Registry Header table |
| SI-HEADER | Second part of the transaction that provides application and transaction specific information relevant to CSM's Standard Interface. | | Character 105 | Yes | Details on this field is in the SI Header table. Only the fields relevant to this transaction are described below |
| TICKET NUMBER | The ticket number on which the detail is being requested | As assigned by CSM | Character 13 | Yes | Field is in the SI header |
| EB FIXED DATA | Not relevant to the Service Inquiry application | | Character 30 | Yes | Needs to be filled with blanks |
| INSTANCES | Gives the number of fields to be changed | As requested by the customer | Numeric 5 | Yes | The data area that follows is an array of name-value pairs that are repeated for each field |
| ELEMENT-NAME1 | Indicates to CSM/SI, the data element whose value needs to be changed | As requested by the customer | Character 13 | Yes | One per field to be changed |
| ELEMENT-VALUE1 | This field is used as the value to which the data element needs to be changed to. | As applicable | Character 30 | Yes | One per field to be changed |

Change Ticket Response

| Field | Description | Type & Size | Note |
|---|---|---|---|
| REGISTRY-HEADER | First part of the transaction that provides information about which Registry Domain, Service names are being used. | Character 109 | Details on this field is in the Registry Header table |
| SI-HEADER | Second part of the transaction that provides application and transaction specific information relevant to CSM's Standard Interface. | Character 105 | Details on this field is in the SI Header table. |
| OUT-STATUS | Gives the status of the request | Numeric 2 | A status of 00 indicates that the ticket was changed successfully |
| OUT-INSTANCES | This response does not return any instances | Numeric 5 | This field is always zero |

APPENDIX D

Display Remarks Response

| Field | Description | Type & Size | Note |
|---|---|---|---|
| REGISTRY-HEADER | First part of the transaction that provides information about which Registry Domain, Service names are being used. | Character 109 | Details on this field is in the Registry Header table |
| SI-HEADER | Second part of the transaction that provides application and transaction specific information relevant to CSM's Standard Interface. | Character 105 | Details on this field is in the SI Header table. |
| OUT-STATUS | Gives the status of the request | umeric | A status of 00 indicates that the request was completed successfully |
| OUT-INSTANCES | Number of remarks returned in the data portion of the response | Numeric 5 | The data area that follows is an array of field entries that are repeated for each remark. |
| REMARK-USER-ID | User id of the person who added the remark | Character 6 | One per ticket |
| REMARK-TYPE | The type of the remark | Character 1 | One per ticket. Only public remarks will be displayed for this application |
| REMARK-SEQ | Indicates the order of the remarks | Character 5 | One per ticket |
| REMARK-REMARK | Contains the actual text of the remark | Character 57 | One per ticket |
| REMARK-DATE-TIME | Denotes the date and time when the remark was added | Character 11 | One per ticket Format is MM/DD HH:MM |

APPENDIX E

Add Remarks Request

| Field | Description | Value | Field Type & Size | Required | Note |
|---|---|---|---|---|---|
| REGISTRY- HEADER | First part of the transaction that provides information about which Registry Domain, Service names are being used. | | Character 109 | Yes | Details on this field is in the Registry Header table |
| SI-HEADER | Second part of the transaction that provides application and transaction specific information relevant to CSM's Standard Interface. | | Character 105 | Yes | Details on this field is in the SI Header table. Only the fields relevant to this transaction are described below |
| TICKET NUMBER | The ticket number on which the remark is being added | As assigned by CSM | Character 13 | Yes | Field is in the SI header |
| EB FIXED DATA | Not relevant to the Service Inquiry application | | Character 30 | Yes | Needs to be filled with blanks |
| INSTANCES | Gives the number of remarks being added | As chosen by the customer | Numeric 5 | Yes | The data area that follows is an array of field entries that are repeated for each remark |
| REMARK-TEXT | The actual text of the remark | As written by the customer | Character 57 | Yes | One per ticket |
| REMARK-SEQ | Denotes the order of the remark | Depends on the order of the remark | Character 5 | Yes | One per ticket |
| REMARK-USER-ID | User id of the person adding the remark | | Character 6 | Yes | One per ticket |
| REMARK-TYPE | The type of the remark | B | Character 1 | Yes | One per ticket Customer remarks are always "public" i.e. type 'B' |
| REMARK-DATE-TIME | Denotes the date and time when the remark was added | Current timestamp | Character 11 | Yes | One per ticket Format is MM/DD HH:MM |

Add remarks Response

| Field | Description | Type & Size | Note |
|---|---|---|---|
| REGISTRY- HEADER | First part of the transaction that provides information about which Registry Domain, Service names are being used. | Character 109 | Details on this field is in the Registry Header table |
| SI-HEADER | Second part of the transaction that provides application and transaction specific information relevant to CSM's Standard Interface. | Character 105 | Details on this field is in the SI Header table. |
| OUT-STATUS | Gives the status of the request | Numeric 2 | A status of 00 indicates that the remark was added successfully |
| OUT-INSTANCES | This response does not return any instances | Numeric 5 | This field is always zero | vii

APPENDIX F

Display Activities Response

| Field | Description | Type & Size | Note |
|---|---|---|---|
| REGISTRY-HEADER | First part of the transaction that provides information about which Registry Domain, Service names are being used. | Character 109 | Details on this field is in the Registry Header table |
| SI-HEADER | Second part of the transaction that provides application and transaction specific information relevant to CSM's Standard Interface. | Character 105 | Details on this field is in the SI Header table. |
| OUT-STATUS | Gives the status of the request | Numeric 2 | A status of 00 indicates that the request was completed successfully |
| OUT-INSTANCES | Number of activities returned in the data portion of the response | Numeric 5 | The data area that follows is an array of field entries that are repeated for each activity |
| TRB-ACTIVITY | Is a code that denotes the type of activity | Character 3 | One per ticket. The values it can take are OPN, R O, R B, CLT, STA, APR, ASN, CNT and ESC |
| LOC-FROM-TYPE | The type of the location /organization from which the activity is initiated | Character 1 | One per ticket. Values are predefined and is 1 for MCI organizations, and typically for this application |
| LOC-FROM-LOC | The organization code of the Location /organization in which the activity is initiated | Character 3 | One per ticket |
| LOC-TO-TYPE | The type of the location /organization to which the activity is directed | Character 1 | One per ticket. Values are predefined and is 1 for MCI organizations, and typically for this application. Only applicable to R O and R B activities. |
| LOC-TO-LOC | The organization code of the Location /organization to which the activity is directed | Character 3 | One per ticket. Only applicable to R O and R B activities. |
| ACTV-DATE | Date of the activity | Character 6 | One per ticket. Format is YYMMDD |
| ACTV-TIME | Time of the activity | Character 4 | One per ticket. Format is HHMM |
| ACTV-CLEAR-CODE | Describes the reason for clearing a ticket | Character 3 | One per ticket. Only required for Refer Back( R B) and close (CLT) activities |
| CLEAR-CODE-ATR | Not applicable to Service Inquiry application | Character 1 | One per ticket |
| ACTV-REMARK | Tells how long the ticket should be referred to the customer time | Character 19 | One per ticket. Only applicable for R O to Customer |
| USER-ID | User-id of the person who entered the activity | Character 8 | One per ticket |
| TOTAL-TIME | The total time that the ticket has been open | Character 6 | One per ticket. Only displayed if the ticket is closed |
| CUST-TIME | The amount of time that the ticket has been referred to the customer. This time does not count against MCI for the time taken to resolve the problem. | Character 6 | One per ticket. Only displayed if the ticket is closed |

| OUT-TIME | The total time minus the customer time | Character 6 | One per ticket<br>Only displayed if the ticket is closed |
|---|---|---|---|
| CLOSE-TIME | Not used any more | Character 6 | |

APPENDIX G

Open Ticket Request

| Field | Description | Value | Field Type & Size | Required | Note |
|---|---|---|---|---|---|
| REGISTRY- HEADER | First part of the transaction that provides information about Which Registry Domain, Service names are being used. | | Character 109 | Yes | Details on this field is in the Registry Header table |
| SI-HEADER | Second part of the transaction that provides application and transaction specific information relevant to CSM's Standard Interface. | | Character 105 | Yes | Details on this field is in the SI Header table. Only the fields relevant to this transaction are described below |
| EB FIXED DATA | Not relevant to the Service Inquiry application | | Character 30 | Yes | Needs to be filled with blanks |
| INSTANCES | Gives the number of data elements that are passed on this request | Varies depending on the no. of data elements | Numeric 5 | Yes | The data area that follows is an array of name-value pairs that are repeated for each data element. This field denotes the number of data elements that are placed in the array and can have a max. of 100 data elements |
| ELEMENT- NAME | Indicates to CSM/SI to use the corresponding value for this data element. | Data Element name | Character 13 | Yes | The actual data element value is in the next field |
| ELEMENT-VALUE | This value is used to create the ticket | Actual data element value | Character 30 | Yes | |

Open Ticket Response

| Field | Description | Type & Size | Note |
|---|---|---|---|
| REGISTRY- HEADER | First part of the transaction that provides information about which Registry Domain, Service names are being used. | Character 109 | Details on this field is in the Registry Header table |
| SI-HEADER | Second part of the transaction that provides application and transaction specific information relevant to CSM's Standard Interface. | Character 105 | Details on this field is in the SI Header table. |
| TICKET NUMBER | Gives the number of the newly created ticket | Character 13 | Found in SI Header |
| OUT-STATUS | Gives the status of the request | Numeric 2 | A status of 00 indicates that the request was completed successfully |
| OUT-INSTANCES | This field is zero since this response does not actually return anything but only acknowledges the creation of a new ticket. | Numeric 5 | |

APPENDIX H

Enter Activity Request

| Field | Description | Value | Field Type & Size | Required | Note |
|---|---|---|---|---|---|
| REGISTRY- HEADER | First part of the transaction that provides information about which Registry Domain, Service names are being used. | | Character 109 | Yes | Details on this field is in the Registry Header table |
| SI-HEADER | Second part of the transaction that provides application and transaction specific information relevant to CSM's Standard Interface. | | Character 105 | Yes | Details on this field is in the SI Header table. Only the fields relevant to this transaction are described below |
| TICKET NUMBER | The ticket number on which the details is being requested | As assigned by CSM | Character 13 | Yes | Field is in the SI header |
| EB FIXED DATA | Not relevant to the Service Inquiry application | | Character 30 | Yes | Needs to be filled with blanks |
| INSTANCES | Gives the number of activity fields that are passed on this request | 00003 | Numeric 5 | Yes | The data area that follows is an array of name-value pairs that are repeated for each field in the activity |
| ELEMENT- NAME1 (SI TO LOC) | Indicates to CSM/SI to use the corresponding value for this field | "SI TO LOC" | Character 13 | Yes | The actual value is denoted in the next field |
| ELEMENT-VALUE1 (actual ORG code) | The organization code of the Location /organization to which the activity is directed | ORG of the destination organization | Character 30 | Yes | Only used for R O and R B activities. |
| ELEMENT- NAME2 (SI TO LOC TYP) | Indicates to CSM/SI to use the corresponding value for this field | "SI TO LOC TYP" | Character 13 | Yes | The actual value is denoted in the next field |
| ELEMENT-VALUE2 (actual organization type) | The type of the location /organization to which the activity is directed | 1 | Character 30 | Yes | Values are predefined and it is set to 1 for MCI organizations and this application. Only used for R O and R B activities. |
| ELEMENT- NAME3 (SI FROM LOC) | Indicates to CSM/SI to use the corresponding value for this field | "SI FROM LOC" | Character 13 | Yes | The actual value is denoted in the next field |
| ELEMENT-VALUE3 (actual ORG code) | The organization code of the Location /organization in which the activity is initiated | 1 | Character 30 | Yes | |
| ELEMENT- NAME4 (SI FROM LOC TYP) | Indicates to CSM/SI to use the corresponding value for this field | "SI FROM LOC TYP" | Character 13 | Yes | The actual value is denoted in the next field |
| ELEMENT-VALUE4 (actual organization type) | The type of the location /organization to which the activity is directed | 1 | Character 30 | Yes | Values are predefined and is 1 for MCI organizations |
| ELEMENT- NAME5 (SI ACT CODE) | Indicates to CSM/SI to use the corresponding value for this field | "SI ACT CODE" | Character 13 | Yes | The actual value is denoted in the next field |
| ELEMENT-VALUE5 (actual activity code) | Denotes the activity being added on the ticket | OPN R O R B CLT | Character 30 | Yes | These are only values for the activities that this application will be adding |
| ELEMENT- NAME6 (SI ACT REMARK) | Indicates to CSM/SI to use the corresponding value for this field | "SI ACT REMARK" | Character 13 | Yes | The actual value is denoted in the next field |
| ELEMENT-VALUE6 (actual activity description) | This is used when the ticket is being referred out to customer time and tells the length of time to be referred out. | As described by the customer | Character 30 | Yes | Only applicable for R O to Customer. |
| ELEMENT- NAME7 (SI CLEAR CODE) | Indicates to CSM/SI to use the corresponding value for this field | "SI CLEAR CODE" | Character 13 | Yes | The actual value is denoted in the next field |
| ELEMENT-VALUE7 (actual clear code) | Describes the reason for clearing a ticket | 029 | Character 30 | Yes | Only required for Close (CLT) activities |

Enter Activity Response

| Field | Description | Type & Size | Note |
|---|---|---|---|
| REGISTRY- HEADER | First part of the transaction that provides information about which Registry Domain, Service names are being used. | Character 109 | Details on this field is in the Registry Header table |
| SI-HEADER | Second part of the transaction that provides application and transaction specific information relevant to CSM's Standard Interface. | Character 105 | Details on this field is in the SI Header table. |
| OUT-STATUS | Gives the status of the request | Numeric 2 | A status of 00 indicates that the activity was added successfully |
| OUT-INSTANCES | This response does not return any instances | Numeric 5 | This field is always zero |

Appendix I
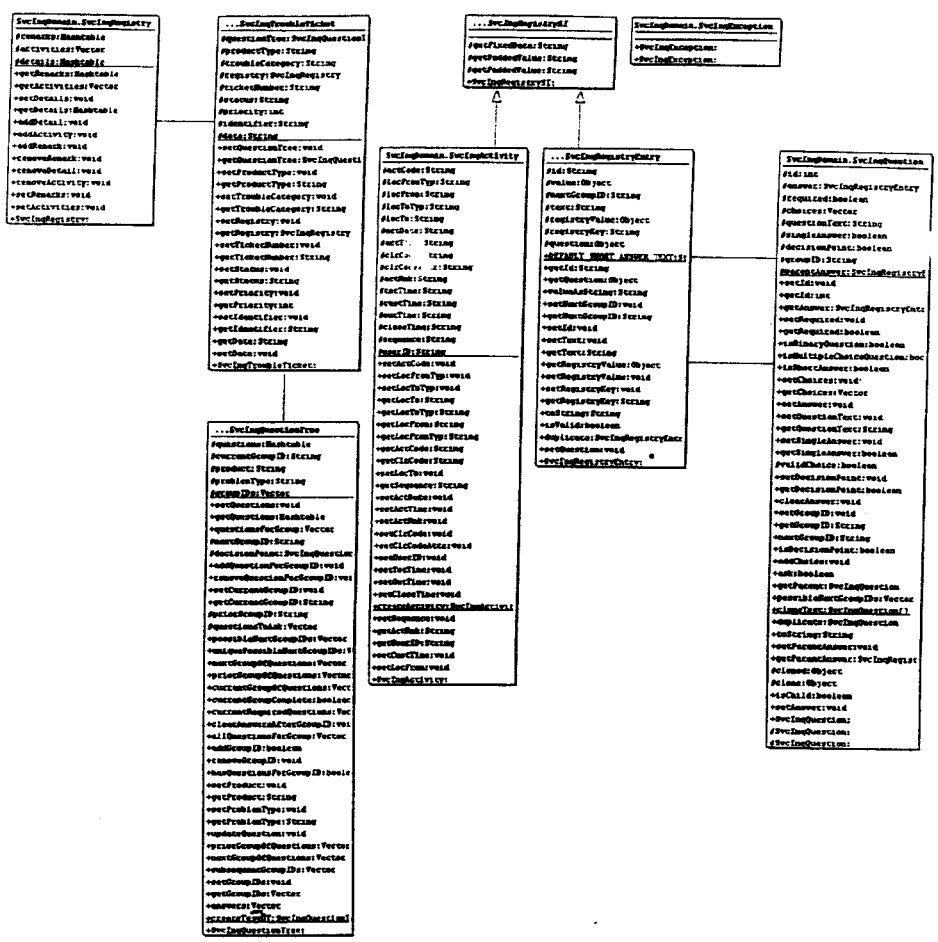
xiii

APPENDIX J

Registry Header

| Field | Description | Value | Field Type & Size | Required | Note |
|---|---|---|---|---|---|
| REG-ID | Registry id. | REG | Character 3 | Yes | |
| REG-DOMAIN | Registry Domain | CSM/SI | Character 6 | Yes | |
| REG-FROM-NONMVS-APPL | The service name that indicates where the transaction came from | SERVINQ-SI | Character 10 | No | Is only used for documentation purpose |
| REG-TO-NONMVS-APPL | The service name that the response of the transaction should be sent to. It is the return address of the requester | SI-SERVINQ | Character 10 | Yes | |
| REG-REGION-QUALIFIER | This denotes CICS region where the SI is running on CSM | As assigned by CSM | Character 2 | Yes | |
| REG-REQUESTER-DEFINED | This field can be used by the requesting system to match up responses to the requests that generated them | | Character 44 | No | |
| REG-USER-ID | Identifies the user who made the request | | Character 8 | No | |
| REG-MAX-QUE-NUMBER | No longer used by SI | 00 | Character 2 | No | |
| REG-MESSAGE-ID | This field can be used by the requesting system to match up responses to the requests that generated them | As generated by the requester | Character 8 | No | Although is technically not 'required' it needs to be put in since CSM supports only asynchronous, one-way messaging, this will be very useful feature |
| REG-FAILOVER-FLAG | Used by CSM to decide which route to send the responses. If set to 'Y' it will use the backup route otherwise it uses the normal route. | N | Character 1 | Yes | |
| BLANK FILLER | Has no meaning. | | Character 6 | No | |
| REG-FINAL-FLAG | Is used to denote if the response is the final response generated by the request. Only applicable to outbound responses | Depends on the order of the response | Character 1 | No | If a single response is generated, this will be 'Y' |
| REG-CHAIN-NUMBER | Is used to indicate the sequence of the responses for requests generating multiple responses since responses may not be received in the order sent | Depends on the order of the response | Numeric 3 | No | Only applicable to outbound responses |
| REG-DATA-BYTES-NUM | Is the length of the SI header and the data portion of the CSM Transaction | As generated by the requester | Numeric 5 | Yes | This number will be different for inbound requests and outbound responses |

Standard Interface Header

| Field | Description | Value | Field Type & Size | Required | Note |
|---|---|---|---|---|---|
| INTERFACE-ID | The ID of the interfacing system that is sending the request to SI | STR | Character 3 | Yes | |
| ORG-ID | The organization id of the requesting organization | As assigned to the organization | Character 3 | No | |
| TERM-ID | Not used by CSM anymore | | Character 16 | No | |
| RACF-ID | Mainframe identification for the person making the request | COSTAR | Character 8 | No | This has been assigned by CSM |
| TERM-USER-FLD | Not used by CSM anymore | | Character 8 | No | |
| TICKET NUM | The ticket number that the request corresponds to | A: assigned by CSM | Character 13 | | Required for some transactions and optional for others |
| DATA-LENGTH | The length of the data portion of the request, Transaction length minus registry header and SI header | Depends on the transaction | Numeric 5 | Yes | |
| TIMESTAMP | The date and time the transaction was received by SI | | Character 26 | No | |
| TRANSACTION-TYPE | Identifies the transaction request or response sent to or from SI | As assigned by CSM | Character 3 | Yes | |
| DATA | Not used by CSM anymore | | Character 3 | No | |
| FUNCTION | Not used by CSM anymore | | Character 8 | No | |
| ACTIVITY | Not used by CSM anymore | | Character 3 | No | |
| CHAIN-TOTAL | Not used by CSM anymore | | Numeric 3 | No | |
| CHAIN-NUMBER | Not used by CSM anymore | | Numeric 3 | No | |

What is claimed is:

1. A trouble ticket management system for enabling an Internet enabled customer to generate a trouble ticket relating to a service provided by an enterprise to said customer, said system comprising:

(a) an Internet enabled customer work station having a client web browser application forming an integrated interface for enabling IP communication between said customer and a network of said enterprise, said client application generating an object-oriented request message for generating a new trouble ticket based on a specified product and problem type;

(b) means for authenticating said customer as having trouble ticket entitlement within said enterprise;

(c) a customer service management system for generating and tracking trouble tickets, said system having at least one database for identifying said customer and trouble ticket entitlement for said customer, each of said trouble tickets having multiple data fields;

(d) transaction manager server for receiving said object-oriented request, generating a trouble ticket request transaction message in accordance with said received objects, communicating said request transaction message to said customer service management system for fulfilling said customer requests, and for downloading downloaded trouble ticket response data from said customer service management system, said transaction manager server further translating said downloaded trouble ticket response data into a trouble ticket object for communication to said integrated interface;

whereby said customer service management system enables independent customer and enterprise tracking of said trouble tickets.

2. The trouble ticket management system as claimed in claim 1, wherein said client web browser application generates an object-oriented query request for obtaining status of an existing trouble ticket based on customer-specified search criteria included in said query request, said downloaded trouble ticket response information including trouble ticket status information of existing trouble tickets in accordance with said request.

3. The trouble ticket management system as claimed in claim 2, wherein said transaction server includes process for enabling creation of customer-specific trouble ticket query filters enabling future query requests having pre-determined search criteria, said query filters downloaded to said client web browser application for user selection prior to generating said request object.

4. The trouble ticket management system as claimed in claim 1, wherein said transaction manager server comprises a requestor class objects implementing methods for receiving said object-oriented customer requests, and performing translation of said request message into said transaction request message suitable for use by said customer management system.

5. The trouble ticket management system as claimed in claim 1, wherein said transaction manager server comprises receiver class objects implementing methods for receiving said trouble ticket response data from said customer management system and parsing said response data to generate said transaction response message suitable for display at said integrated interface.

6. The trouble ticket management system as claimed in claim 2, wherein said trouble ticket information includes remarks representing comments added to a trouble ticket by a customer or trouble ticket resolution entity, said object-oriented query request including a request for adding customer generated remarks to an existing or newly created trouble ticket.

7. The trouble ticket management system as claimed in claim 2, wherein said trouble ticket information includes one or more activities representing events associated with a trouble ticket, said object-oriented query request includes request for viewing activities related to an existing trouble ticket.

8. The trouble ticket management system as claimed in claim 2, wherein said trouble ticket search criteria includes a trouble ticket number.

9. The trouble ticket management system as claimed in claim 2, wherein said trouble ticket search criteria includes an indication of priority of said trouble ticket.

10. The trouble ticket management system as claimed in claim 2, wherein said trouble ticket search criteria includes an indication of a status of said trouble ticket.

11. The trouble ticket management system as claimed in claim 2, further including a trouble ticket question tool enabling presentation of specific questions regarding a specific product and problem type for which a trouble ticket may be generated, said specific questions being presented via said customer interface and requiring customer answers for entry via said integrated interface prior to trouble ticket generation.

12. The trouble ticket management system as claimed in claim 11, wherein said trouble ticket question tool enables presentation of specific questions regarding a specific product and problem type in a pre-specified order.

13. The trouble ticket management system as claimed in claim 11, wherein said trouble ticket question tool enables generation of questions according to a QuestionTree structure for presentation to said customer via said interface, a said question of said QuestionTree comprising one or more group identifiers indicating a group to which a question belongs.

14. The trouble ticket management system as claimed in claim 11, wherein said trouble ticket question tool enables designation of a specific question as a decision point, an answer to a given decision point question provided by said customer determining a next group of questions that need to be presented to said user.

15. A method of remotely generating a trouble ticket for a network event at a customer workstation over the Internet, wherein the event relates to a service provided by an enterprise to the customer, said method comprising:

(a) creating at least one customer record relating to a service provided to the customer by the enterprise in a customer service management system, said record including customer entitlement with respect to the service;

(b) enabling Internet access to said customer service management system by said customer;

(c) authenticating said customer entitlement at the time of customer access of said management system;

(d) presenting a web-based communication having a trouble ticket creation screen for creating a new trouble ticket;

(e) generating an object-oriented request message having information necessary for generating a new trouble ticket based on an indicated product and problem type entered into said creation screen;

(f) receiving said object-oriented request and generating a trouble ticket request transaction message in accordance with said received objects, (g) communicating said request transaction message to a customer service management system for fulfilling said customer requests, said customer service management system identifying said customer and trouble ticket entitlement for said customer upon receipt of said customer request message;

(h) downloading trouble ticket response data from said customer service management system for presentation to said client workstation customer; and, (i) translating said downloaded trouble ticket response data into a trouble ticket object for communication to said integrated interface;

whereby said customer service management system enables independent customer and enterprise tracking of said trouble tickets via said client interface.

16. A method of remotely generating a trouble ticket as claimed in claim 15, wherein said step (f) of receiving said object-oriented request includes the step of placing the received object-oriented request in a receive in queue prior to generating said request transaction message.

17. A method of remotely generating a trouble ticket as claimed in claim 15, wherein said step (h) of downloading trouble ticket response data from said customer service management system for presentation to said client workstation customer includes the step of placing the downloaded object-oriented response in a response out queue.

18. A method of remotely generating a trouble ticket as claimed in claim 15 wherein said step (e) further includes the step of enabling a customer to populate a problem classification field at said creation screen customer workstation prior to a transmission of said object-oriented request to said management system.

19. A trouble ticket management system for enabling an Internet enabled customer to generate a trouble ticket relating to a service provided by an enterprise to said customer, said system comprising:

(a) means for authenticating said customer having a trouble ticket entitlement within said enterprise;

(b) a customer service management system for generating and tracking trouble tickets, said system having at least one database for identifying said customer and trouble ticket entitlement for said customer, each of said trouble tickets having multiple fields;

(c) transaction manager server for receiving an object-oriented request, generating a trouble ticket request transaction message in accordance with said received object-oriented requests, communicating said request transaction message to said customer service management system for fulfilling said customer requests, and for downloading downloaded trouble ticket response data from said customer service management system, said transaction manager server further translating said downloaded trouble ticket response data into a trouble ticket object for communication with an integrated interface, wherein said object-oriented requests are generated by an Internet enabled customer work station having a client web browser application forming the integrated interface for enabling IP communication between said customer and a network of said enterprise and said object-oriented requests are based on a specific product and problem;

whereby said customer service management system enables independent customer and enterprise tracking of said trouble tickets.

* * * * *